United States Patent [19]

Baumgartner et al.

[11] Patent Number: 5,138,614
[45] Date of Patent: Aug. 11, 1992

[54] TRANSFORMATION METHOD FOR NETWORK CONFERENCE CONNECTIONS

[75] Inventors: Thomas J. Baumgartner, St. Charles; Wu-Hon F. Leung, Downers Grove, both of Ill.

[73] Assignee: AT&T Bell Laboratories, Murray Hill, N.J.

[21] Appl. No.: 508,867

[22] Filed: Apr. 12, 1990

[51] Int. Cl.$^5$ .................................. H04Q 11/04
[52] U.S. Cl. ............................... 370/62; 370/60; 379/202
[58] Field of Search ............... 370/94.1, 60, 62, 85.12, 370/54; 340/825.02, 826, 827; 379/229, 271, 272, 273, 202

[56] References Cited

U.S. PATENT DOCUMENTS

| | | | |
|---|---|---|---|
| 4,540,850 | 9/1985 | Herr et al. | 370/62 |
| 4,550,224 | 10/1985 | Winchell | 370/62 |
| 4,723,272 | 2/1988 | Maat | 379/229 |
| 4,740,954 | 4/1988 | Cotton et al. | 370/62 |
| 4,745,593 | 5/1988 | Stewart | 370/15 |
| 4,748,658 | 5/1988 | Gopal et al. | 379/229 |
| 4,864,559 | 9/1989 | Perlman | 370/93 |
| 4,873,517 | 10/1989 | Baratz et al. | 370/54 |
| 4,894,822 | 1/1990 | Buhrke et al. | 370/222 |
| 4,905,231 | 2/1990 | Leung et al. | 370/94.1 |
| 4,920,484 | 4/1990 | Ranade | 370/60 |
| 4,991,171 | 2/1991 | Teravinna et al. | 370/94.1 |

OTHER PUBLICATIONS

J. J. Degan et al., "Fast Packet Technology for Future Switches", AT&T Technical Journal, vol. 68, No. 2, Mar./Apr. 1989, pp. 36-50.
S. Nojima et al., "High Speed Packet Switching Network for Multi-Media Information", *Proceedings of IEEE 1986 Computer Networking Symposium*, pp. 141-150.
K. Yukimatsu et al., "Multicast Communication Facilities in a High Speed Packet Switching Network", *Proceedings of ICCC '86*, pp. 276-281.
K. A. Lantz, "An Experiment in Integrated Multimedia Conferencing", *Proceedings of the Conference on Computer-Supported Cooperative Work '86*, Dec. 1986, pp. 533-552.
A. Poggio et al., "CCWS: A Computer-Based, Multimedia Information System", Computer, Oct. 1985, pp. 92-103.
L. Aguilar et al., "Architecture for a Multimedia Teleconferencing System", *Proceedings of Conference on Office Information Systems*, Mar. 1988, pp. 1-8.
H. Forsdick, "Explorations into Real-Time Multimedia Conferencing", *Proceedings of the 2nd International Symposium on Computer Message Systems*, IFIP, Sep., 1985, pp. 331-347.
W. H. Leung et al., "A Set of Operating System Mechanisms to Support Multi-Media Applications", *Proceedings of 1988 International Zurich Seminar on Digital Communications*, Mar. 1988, pp. B4.1-B4.6.
A. Ghafoor et al., "An Efficient Communication Structure for Distributed Commit Protocols", *IEEE Journal on Selected Areas in Communications*, vol. 7, No. 3, Apr. 1989, pp. 375-389.

(List continued on next page.)

Primary Examiner—Douglas W. Olms
Assistant Examiner—Dang Ton
Attorney, Agent, or Firm—R. T. Watland; M. B. Johannesen

[57] ABSTRACT

A transformation method for network conference connections where the network operations are determined based on stored information defining the original connection and stored information defining the target connection thus affording the opportunity to advantageously reuse existing paths. The paths to be deleted and the paths to be added to effect the transformation are determined such that no path is both deleted from and added to any switch. The connection information may be stored either in a central control entity or an intra-switch path information in the individual switches of the network. In the latter case, the individual switches determine their own intra-switch path additions and deletions in a distributed fashion.

25 Claims, 18 Drawing Sheets

OTHER PUBLICATIONS

S. E. Minzer et al., "New Directions in Signaling for Broadband ISDN", *IEEE Communications Magazine*, Feb. 1989, pp. 6-14.

E. Arthurs et al., "The Architecture of a Multicast Broadband Packet Switch", *Proceedings of IEEE INFOCOM '88*, pp. 1-8.

K. Y. Eng et al., "Multicast and Broadcast Services in a Knockout Packet Switch", *Proceedings of IEEE INFOCOM '88*, pp. 29-34.

J. S. Turner, "Design of a Broadcast Packet Switching Network", *IEEE Trans. on Communications*, vol. 36, No. 6, 1988, pp. 734-743.

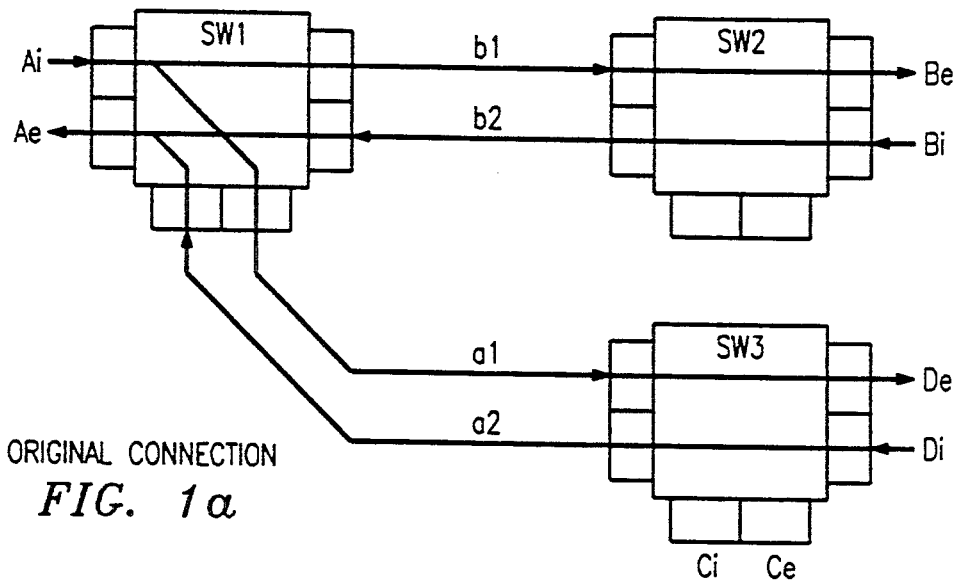
ORIGINAL CONNECTION
FIG. 1a
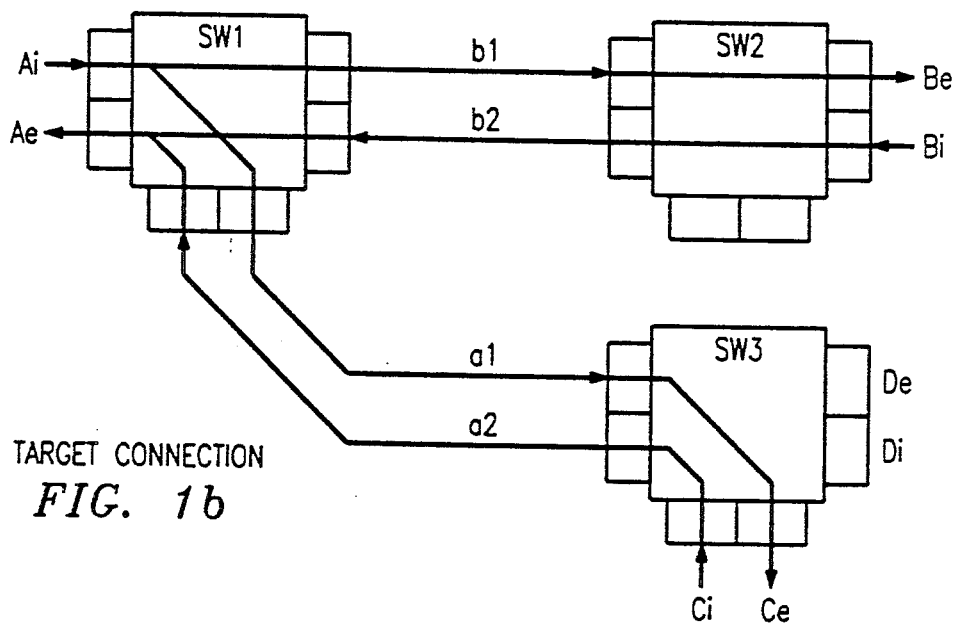
TARGET CONNECTION
FIG. 1b
ORIGINAL CONNECTION
FIG. 1c
TARGET CONNECTION
FIG. 1d

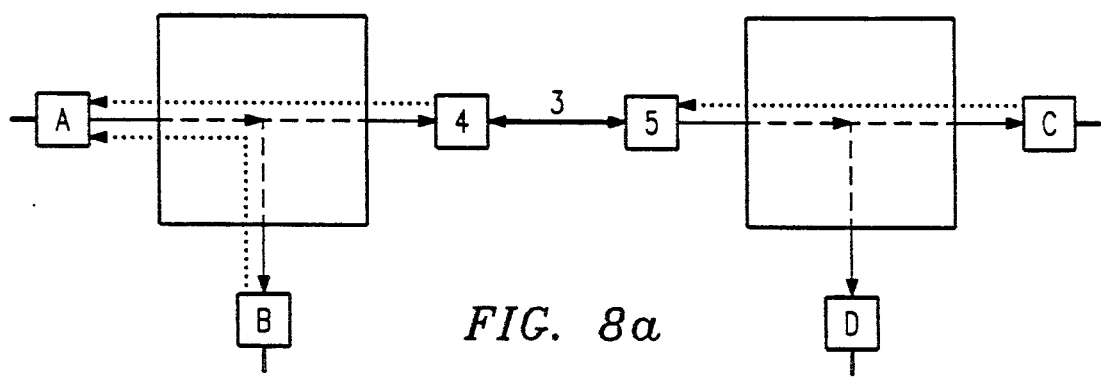
FIG. 8a
FIG. 8b
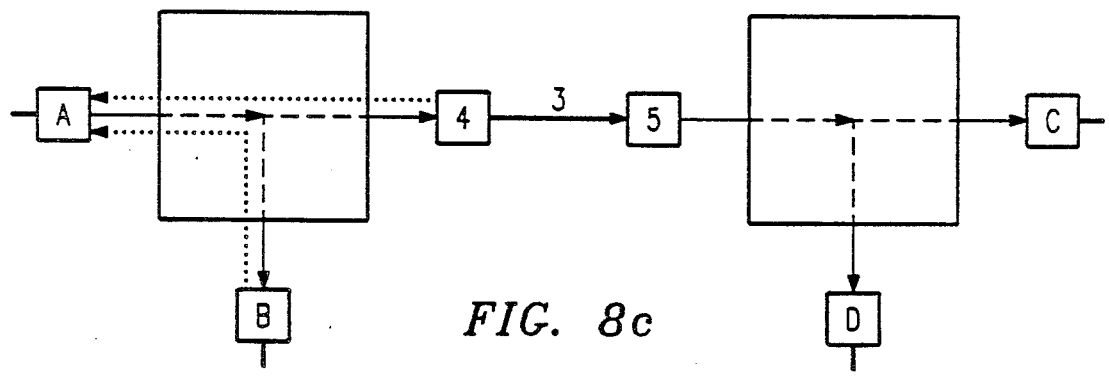
FIG. 8c
FIG. 8d

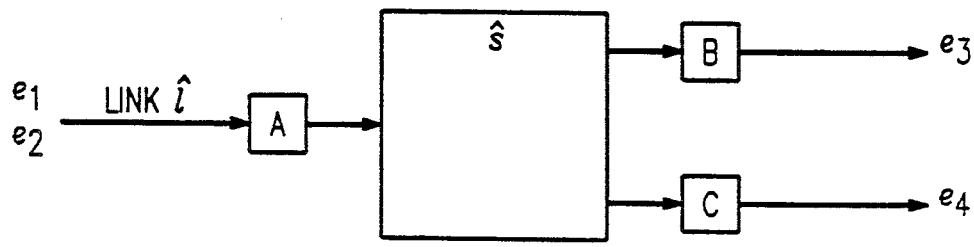
FIG. 9a    FIG. 9b
FIG. 9c
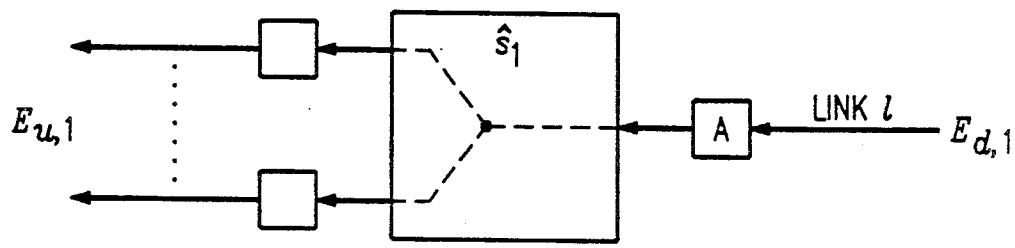
FIG. 10a
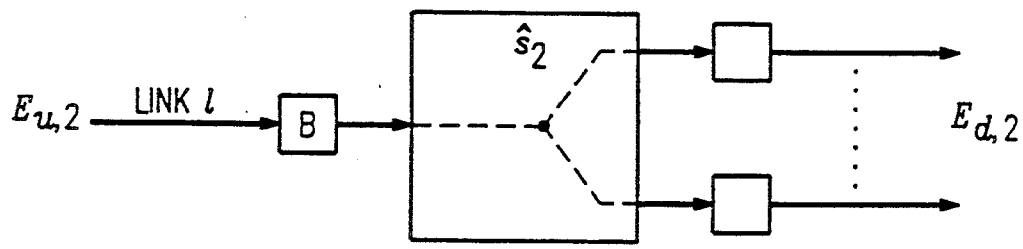
FIG. 10b

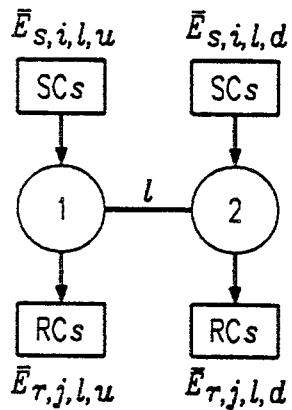 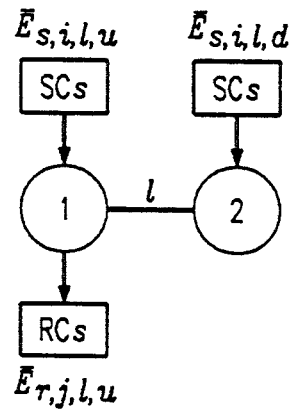 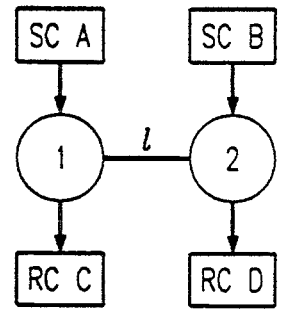
FIG. 11a   FIG. 11b   FIG. 11c
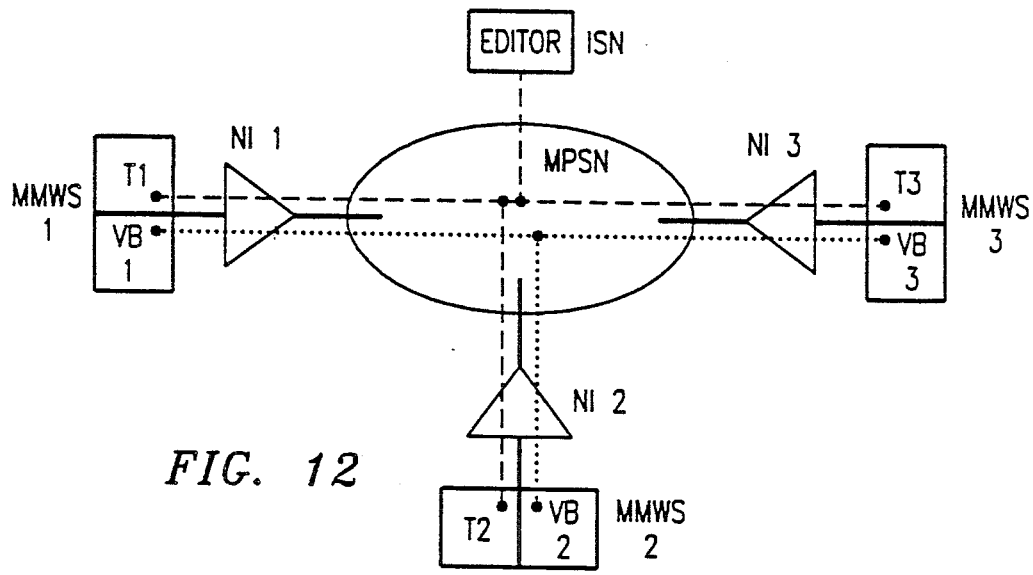
FIG. 12
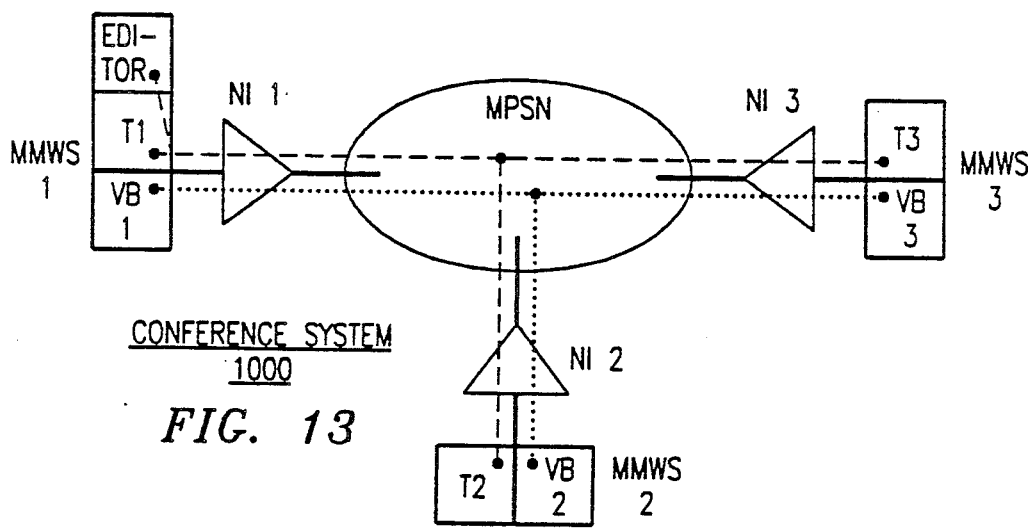
FIG. 13

LOGICAL CONNECTION

PHYSICAL CONNECTION

CENTRALIZED
REPRESENTATION

FIG. 16

DISTRIBUTED
REPRESENTATION

FIG. 17

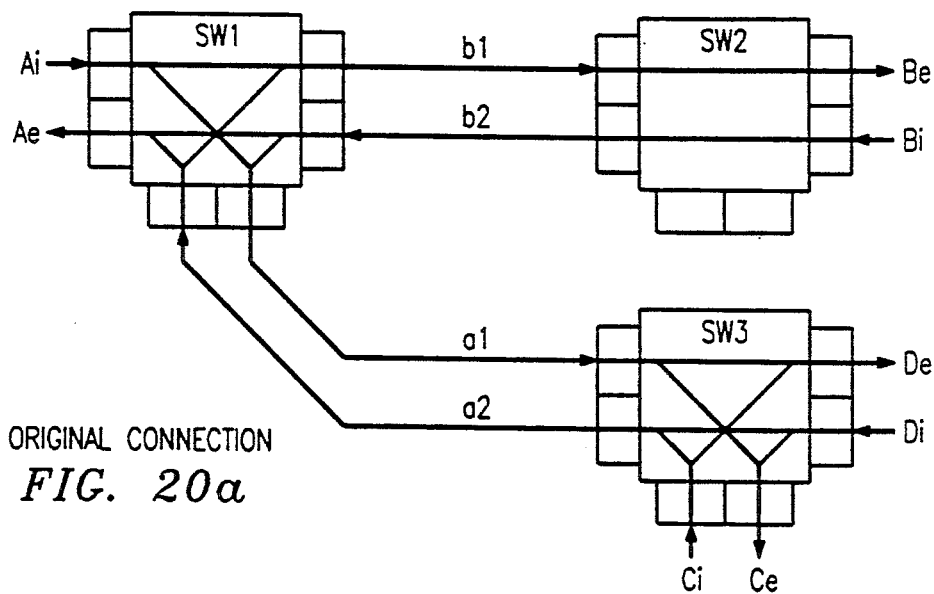
ORIGINAL CONNECTION
FIG. 20a
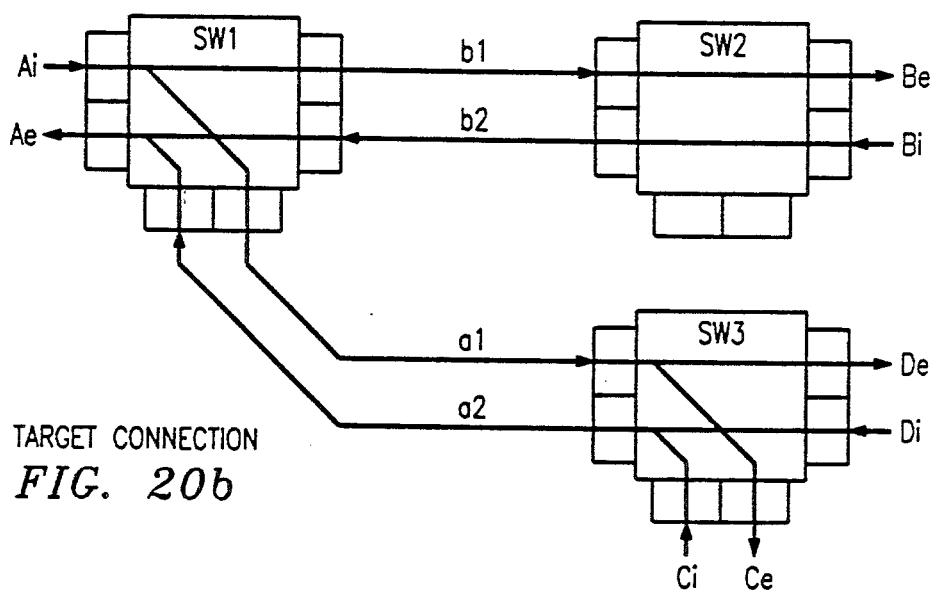
TARGET CONNECTION
FIG. 20b
M{O1}
|    | Ae | Be | Ce | De | a1 | a2 | b1 | b2 |
|----|----|----|----|----|----|----|----|----|
| Ai | −  |    |    |    |    | 1  | 1  |    |
| Bi |    | −  |    |    |    |    |    | 1  |
| Ci |    |    | −  | 1  | 1  |    |    |    |
| Di |    |    | 1  | −  |    | 1  |    |    |
| a1 |    | 1  | 1  |    | −  |    |    |    |
| a2 | 1  |    |    |    |    | −  |    | 1  |
| b1 |    | 1  |    |    |    |    | −  |    |
| b2 | 1  |    |    |    |    | 1  |    | −  |
FIG. 20c
M{T1}
|    | Ae | Be | Ce | De | a1 | a2 | b1 | b2 |
|----|----|----|----|----|----|----|----|----|
| Ai | −  |    |    |    |    | 1  | 1  |    |
| Bi |    | −  |    |    |    |    |    | 1  |
| Ci |    |    | −  | 0  |    | 1  |    |    |
| Di |    |    | 0  | −  |    | 1  |    |    |
| a1 |    | 1  | 1  |    | −  |    |    |    |
| a2 | 1  |    |    |    |    | −  |    | 0  |
| b1 |    | 1  |    |    |    |    | −  |    |
| b2 | 1  |    |    |    |    | 0  |    | −  |
FIG. 20d

ORIGINAL CONNECTION 1

ORIGINAL CONNECTION 2

TARGET CONNECTION

TRANSFORMATION METHOD FOR NETWORK CONFERENCE CONNECTIONS

CROSS-REFERENCE TO RELATED APPLICATIONS

This application is related to the application of T. J. Baumgartner, Y. H. Hwang, E. H. Jones, W. F. Leung L. F. Morgan, and S. Tu Ser. No. 07/509,010 entitled "Multiple Call Control Method in a Multimedia Conferencing System", and W. F. Leung and S. Tu Ser. No. 07/508,866, now U.S. Pat. No. 5,103,444 entitled "Conference Connection Method in a Multicast Packet Switching Network" filed concurrently herewith and assigned to the same assignee as the present application.

TECHNICAL FIELD

This invention relates to communication conferencing.

BACKGROUND AND PROBLEM

The Rapport multimedia conferencing system, disclosed in the S. R. Ahuja et al. article, "The Rapport Multimedia Conferencing System", *Proceedings of Conference on Office Information Systems*, Mar. 1988, supports interactive, real-time distributed conferences among two or more people. The system provides an environment in which many types of meetings can take place, including telephone conversations, discussion among colleagues, and lectures. Rapport is designed to help people emulate face-to-face conferences as closely as possible with their workstations. A Rapport system user may participate in many conferences concurrently by switching among contexts at the click of a mouse button. This is equivalent to being able to walk in and out of several meeting rooms (and one's office) instantly.

It is anticipated that this capability will encourage users to keep many conferences active for long periods of time in much the same fashion as the use of screen windows allows one to keep many programs and files active with the present data networks. One such long-lived conference might be an intercom connection between a manager and a secretary. Others might be among the collaborators in a design project or the authors of a paper. It is anticipated that once the capability for multiple concurrent calls is provided, it will be useful to merge and split such calls. For example, the manager may ask the secretary to join a design project conference from time to time to assist the project team. In addition to merging and splitting calls, typical applications would include the addition of several parties to a conference, the addition of some parties and the deletion of others, or changing the connectivity pattern among parties, for example, from multipoint-to-multipoint to point-to-multipoint with upstream capability. A general problem associated with these actions relates to the transformation of an original conference connection through a network of switching systems, to a target connection. Although tearing down the original connection and establishing the target connection from scratch will always work, it is not, in general, an efficient approach in terms of the number and complexity of the operations to be performed on the network.

The J. S. Turner article, "Design of a Broadcast Packet Switching Network", *IEEE Transactions on Communications*, Jun. 1988, discloses a broadcast packet switching network where each broadcast source and its associated connections induce a tree in the network. When a user disconnects from a broadcast channel, the corresponding branch of the tree is removed. When a user requests connection to a channel, the network attempts to find a nearby branch of the broadcast tree and connects the user at the nearest point. The Turner article provides no suggestion, however, concerning efficient network transformation other than the addition or deletion of a single party.

In view of the foregoing, a deficiency in the art is the absence of an efficient general method of transforming an original conference connection through a switching network, to a target conference connection which involves more than the addition or deletion of a single party or user station.

SOLUTION

This deficiency is eliminated and a technical advance is achieved in accordance with the principles of the invention in an illustrative network transformation method where the network operations are determined based on stored information defining the original connection and stored information defining the target connection—thus affording the opportunity to advantageously reuse existing paths. Illustratively, the paths to be deleted and the paths to be added to effect the transformation are determined such that no path is both deleted from and added to any switch. The connection information may be stored either in a central control entity or as intra-switch path information in the individual switches of the network. In the latter case, the individual switches determine their own intra-switch path additions and deletions in a distributed fashion.

In a method of the invention, an original connection is established among an original plurality of user stations through a communication network. Information is stored defining the original connection. A target connection is determined among a target plurality of user stations. The union of the original and target pluralities includes at least two user stations not included in the intersection of the original and target pluralities, and the intersection includes at least one user station. Information is stored defining the target connection. Based on the stored information defining the original and target connections, a set of operations is determined to transform the original connection into the target connection. That set of operations is then effected on the network.

The condition that the target connection represents more than the addition or deletion of a single user station may be expressed using set theory terminology by requiring that the union of the user stations of the original and target connections includes at least two user stations not included in the intersection of the user stations of the original and target connections—for example, adding two user stations, deleting two user stations, adding one user station and deleting another, etc. An additional requirement—that the intersection includes at least one user station—means simply that at least one user station is in common between the original and target connections.

In the illustrative arrangement of FIG. 1a, an original connection is established among an original plurality of user stations, A, B, D, through a communication network comprising multicast packet switches SW1, SW2, and SW3. Information is stored defining the paths established through switches SW1, SW2, and SW3 for the original connection. Such information may be stored in a single, central location and/or as individual, intra-switch path information stored by each switch. A target connection (FIG. 1b) is determined among a target plurality of user stations, A, B, C, through the network. Note that the union of the original and target pluralities includes two user stations C and D not included in the intersection of the original and target pluralities, and that the intersection includes two user stations A and B. Information is stored defining the paths through switches SW1, SW2, and SW3 for the target connection. Again the information may be stored in the single, central location and/or as individual, intra-switch path information stored by each switch. A set of operations is determined to transform the original connection into the target connection based on the stored path information, illustratively, in such manner that no path is both deleted from and added to any switch. Both the determination of the target connection, and the determination of the set of operations to transform the original connection, may be performed either by a central control entity, or collectively by the switches SW1, SW2, and SW3 using parallel processing.

The original and target connections through the network are described by matrices M{O1} and M{T1} as shown in FIG. 1c and FIG. 1d. An existing intra-switch path is represented as a logic one and a possible intra-switch path is represented as a logic zero. A first matrix M{needed} (FIG. 2c) is obtained having elements each being a logic one only if the corresponding element of M{O1} is a logic zero and the corresponding element of M{T1} is a logic one. A second matrix M{notneeded} (FIG. 2d) is obtained having elements each being a logic one only if the corresponding element of M{O1} is a logic one and the corresponding element of M{T1} is a logic zero. An intra-switch path is added for each logic one of M{needed} and an intra-switch path is deleted for each logic one of M{notneeded}. The matrix M{common} (FIG. 2e) represents paths that are reused in making the transformation. The relationship among the matrices M{needed}, M{common}, and M{notneeded} is shown in FIG. 2a.

DRAWING DESCRIPTION

FIG. 1a is a diagram of the physical representation of an original connection through a multicast packet switching network comprising three multicast packet switches;

FIG. 1b is a diagram of the physical representation of a target connection through the network of FIG. 1a;

FIG. 1c and FIG. 1d are matrix representations of the original and target connections of FIG. 1a and FIG. 1b respectively;

FIG. 8a–FIG. 8d are diagrams used in describing properties of data packet flow patterns;

FIG. 9a–FIG. 9c and FIG. 10a–FIG. 10b are diagrams used in describing properties of vanilla multicast connections;

FIG. 11a–FIG. 11c are diagrams used in describing properties of strong multicast connections;

FIG. 12 and FIG. 13 are diagrams of two multimedia conferencing arrangements;

FIG. 16 is a matrix comprising a centralized representation of a connection;

FIG. 17 shows individual matrices for each switch in a distributed representation of a connection;

FIG. 20–FIG. 25 are diagrams used in explaining the network transformation method by way of examples using both centralized and distributed connection representations.

DETAILED DESCRIPTION

Multicast Connections

Figure 3:
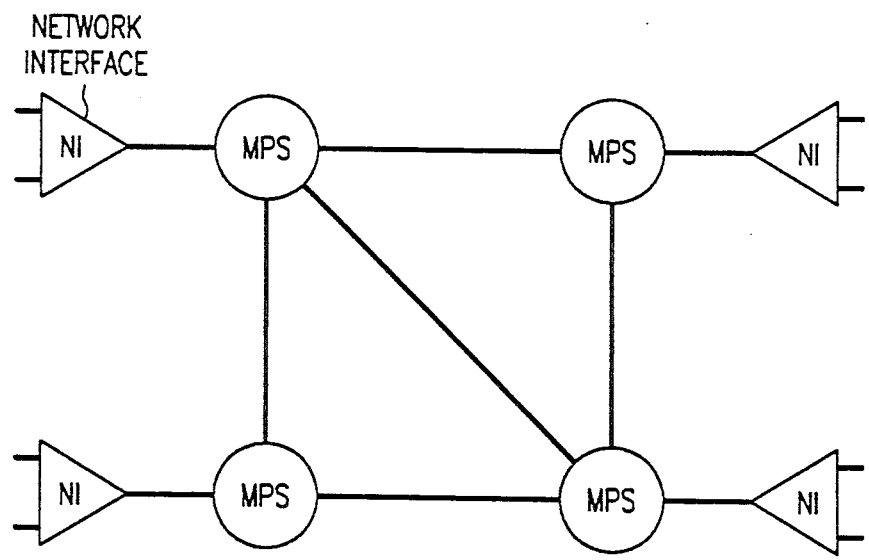
FIG. 3 is a diagram of a multicast packet switching network.

FIG. 3 shows a multicast packet switching network which consists of multicast packet switches (MPSs) and network interfaces (NIs).

To achieve high-speed transmission, the multicast packet switching network is based on fast packet technology (described in J. J. Degan et al., "Fast Packet Technology for Future Switches", *AT&T Technical Journal*, Vol. 68, No. 2, p. 36–50, 1989), having the following attributes: (a) Link-by-link error and flow control is eliminated. Thus, the required field in the data link header is for the logical channel number (LCN), which is used for routing packets through the multicast packet switching network. An LCN for each link within a connection is decided at connection setup time; (b) Edge-to-edge error control can be incorporated within the multicast packet switching network on a per-connection basis; and (c) The multicast packet switching network provides internal connection-oriented services that support high-bandwidth applications very efficiently. In such networks, the required link bandwidth and the end-to-end delay for a multicast application are independent of the number of users. Also, the network performance will not degrade as the number of users increases. These advantages provide a solid foundation for the multicast packet switching network as a vehicle for supporting various multicast applications, especially, interactive multimedia multi-party conferencing.

Figure 4:
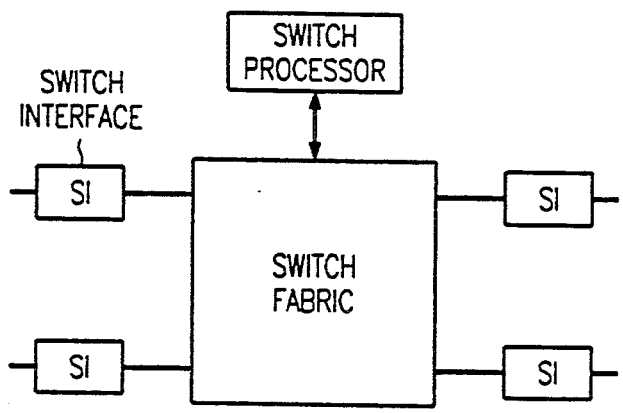
FIG. 4 is a diagram of an individual multicast packet switch in the network of FIG. 3.

A multicast packet switch is composed of a switch fabric, a switch processor, and switch interfaces (SIs), as shown in FIG. 4. The switch fabric is capable of duplicating an incoming packet and routing the copies to desired outgoing ports. An exemplary multicast packet switch is disclosed in the U.S. patent application of K. T. Teraslinna et al., Ser. No. 07/412,952, assigned to the assignee of the present invention.

Figure 5:
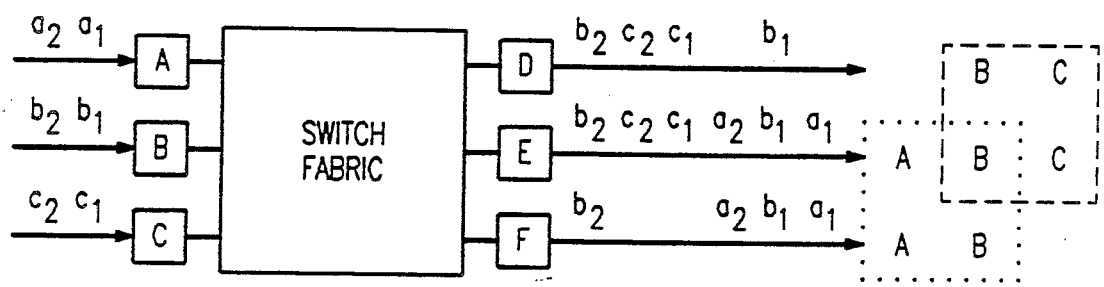
FIG. 5 is a diagram illustrating a strong packet sequencing condition.

[Definition 2.1]: With multiple input streams each destined to multiple outputs, a switch fabric is said to have a. the weak sequencing (WS) property, if it only guarantees point-to-point sequential transfer from each input port to any of its output ports; or b. the strong sequencing (SS) property, if those output ports receiving two or more common inputs have identical interleaved packet streams with respect to the packet streams from the common input ports. For example, in FIG. 5, the two subsequences of outgoing packet streams at switch interfaces D and E (or switch interfaces E and F) containing $\{b_i\}$ and $\{c_i\}$ (or $\{a_i\}$ and $\{b_i\}$) are identical.

A multicast packet switch will be represented as w-MPS (or s-MPS) if its switch fabric has the weak sequencing (or strong sequencing) property.

In general, different links within a multicast connection may use different LCNs. Thus, each switch interface maintains a packet translation table (PTT) and a multicast control table (MCT) to store routing information about those multicast connections. Each entry of a packet translation table, indexed by an incoming LCN, contains a multicast connection number (MCN) and a switch header. On the incoming link, the MCN field stores the MCN assigned to a multicast connection during connection setup. The switch header identifies a set of outgoing links involved in a multicast connection, which is used for packet duplication and routing through a switch fabric. Each entry of the multicast control table, indexed by a MCN, contains the LCN chosen for the outgoing link within a multicast connection.

Figure 6:
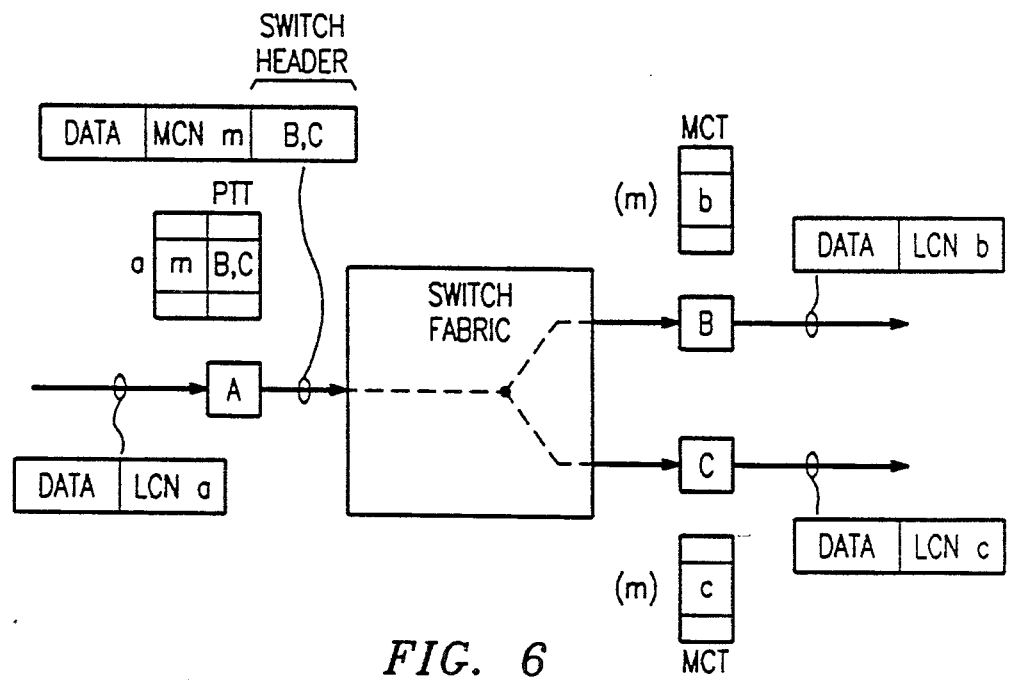
FIG. 6 is a diagram illustrating the packet switching process for a multicast connection through a multicast packet switch.

FIG. 6 illustrates the data packet switching process through a multicast packet switch for a multicast connection. An incoming packet accesses the packet translation table by LCN a at switch interface A. Switch interface A then replaces LCN a in the packet header by the stored MCN m and prepends the stored switch header to the packet for packet duplication and routing. Each outgoing packet uses MCN m in its header to access the multicast control table at the outgoing switch interface and obtains an outgoing LCN. Switch interface B and switch interface C then replace MCN m in the packet header by LCN b and LCN c, respectively. Finally, the switch header of each outgoing packet will be stripped off at the outgoing switch interface before it leaves.

[Lemma 1]: Any arbitrary data packet flow pattern (DPFP) within a multicast packet switch can be achieved.

<Proof>: Given a set of switch interfaces, with an LCN chosen for each switch interface, it is clear that the direction of data packet flow among these switch interfaces can be controlled by writing suitable information into their packet translation tables and multicast control tables.

Figure 7A:
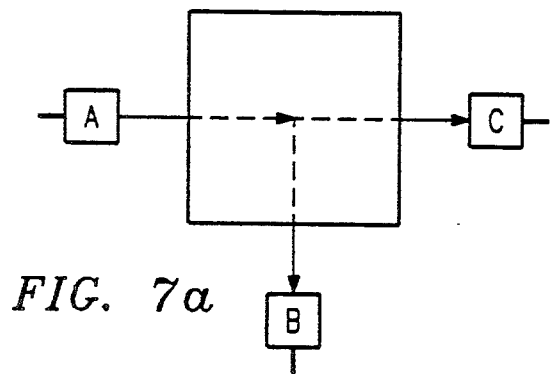
FIG. 7a–FIG. 7c illustrate three data packet flow patterns within a multicast packet switch.
Figure 7B:
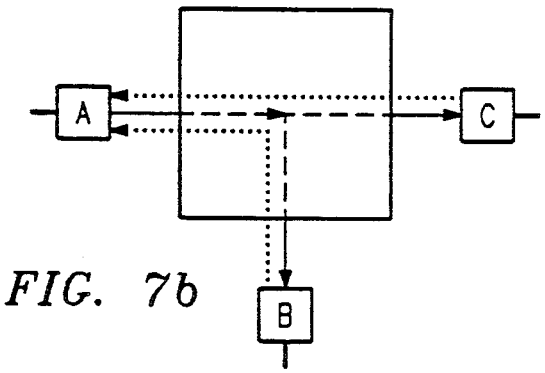
Figure 7C:
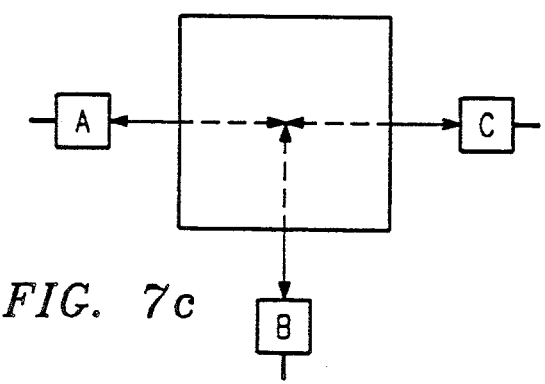

FIG. 7 illustrates three natural data packet flow patterns within a multicast packet switch: (a) point-to-multipoint, (b) point-to-multipoint with upstream capability, and (c) multipoint-to-multipoint. They will be referred to as pattern-1, pattern-2 and pattern-3 data packet flow patterns, respectively.

The switch processor (FIG. 4) establishes and disconnects switched multicast connections across the multicast packet switching network.

A network interface (FIG. 3) provides an access point to the multicast packet switching network for various networks and equipments, e.g., user stations, connected to it. It is responsible for protocol/speed conversion, packet assembly/disassembly, signaling, etc. It also provides an edge-to-edge flow/error control across the multicast packet switching network on a per-connection basis.

A source-based multicast routing method is used to perform multicast connection setup. This method can be applied to both switched multicast connection setup and multicast connectionless packet routing.

For each multicast packet switch in the multicast packet switching network, several spanning trees rooted at this multicast packet switch are generated. A unique global tree number (TN) will be assigned for each tree. Based on these trees, multicast routing tables (MRTs) are established at each multicast packet switch during network initialization. The size of the multicast routing tables depends on the number of multicast packet switches in the multicast packet switching network and the number of trees. Therefore, a tradeoff between the number of trees and memory space required at each multicast packet switch is made. These tables may be updated dynamically. However, it should be done infrequently. The advantage of using multiple spanning trees is to provide alternate multicast routes such that the connection completion rate can be improved. Under normal situations, the connection control packets for establishing or disconnecting a connection progress forward from the source multicast packet switch to the next destination multicast packet switches. They may need to crankback to the source multicast packet switch for finding alternate spanning trees when some multicast packet switch belonging to the chosen spanning tree rejects the new connection setup for some reason.

The basic connection setup procedure is as follows. When a connection setup packet arrives at the source multicast packet switch, the switch processor chooses a tree number, among a set of tree numbers which correspond to those spanning trees rooted at this multicast packet switch, based on a load sharing method. Based on the destination set in the packet and the multicast routing table indexed by the chosen global tree number, the switch processor checks if the appropriate necessary and sufficient conditions described in detail herein are met to determine whether the multicast connection that would be established would be usable to effect communication in accordance with a specified transmission matrix and meeting a given packet sequencing condition. If the check is positive, the switch processor then partitions the destination set into several subsets; each subset will use a different outgoing link. By putting the chosen tree number in the packet and masking off all other destination addresses in the destination set except those in the corresponding subset, a modified copy of the original connection setup packet is then generated and sent to each desired outgoing link. In addition, the switch processor will choose an available multicast connection number (MCN) and send signal packets to update the translation tables in each involved switch interface. When the modified packet reaches the next multicast packet switch, the switch processor uses the tree number in the packet to index a multicast routing table, does some necessary checking, and then further partitions the destination subset. This procedure repeats until all the destinations are reached.

The concept of multicast connections is a natural extension of that of point-to-point connections. That is, a multicast connection is a logical association among a set of network interfaces over which all packets following the same route, need not carry complete destination addresses and arrive in sequence. Based on different requirements, four flavors of multicast connections are defined over an arbitrary multicast packet switching network: vanilla multicast connections (VMCs), multicast virtual circuits (MVCs), strong multicast connections (SMCs) and strong multicast virtual circuits (SMVCs). Roughly speaking, vanilla multicast connections and strong multicast connections only provide network-layer connection-oriented services to the users, and packet loss is allowed. They depend on the users' transport layer to execute error control, if necessary. On the other hand, multicast virtual circuits and strong multicast virtual circuits provide network-layer virtual circuit services to the users, which ensure reliable packet transfer. Therefore, error control in the transport layer is not necessary.

Four flavors of multicast connections are defined on acyclic subgraphs of the graph representing a multicast packet switching network. Acyclic subgraphs guarantee that each multicast connection contains no loop and every packet will reach its destination(s) in finite time and low delay.

[Definition 3.1]:
a. An arbitrary multicast packet switching network is represented by a graph $G=\{S,E,L\}$, where S is the set of all multicast packet switches, E is the set of all network interfaces, and L is the set of all links.
b. $\overline{G}=\{\overline{S}, \overline{E}, \overline{L}\}$ represents an acylic subgraph of G, which interconnects all network interfaces in a subset $\overline{E}$ of E via a subset $\overline{S}$ of S and a subset $\overline{L}$ of L. Any link 1 in $\overline{L}$ cuts $\overline{G}$ into two disjoint subgraphs $\overline{G}_{1,u}$ and $\overline{G}_{1,d}$. Let $\overline{E}_{1,u}$ and $\overline{E}_{1,d}$ be two disjoint subsets of $\overline{E}$, which contain those network interfaces in $\overline{G}_{1,u}$ and $\overline{G}_{1,d}$, respectively.
c. Each network interface contains a sender component (SC) and a receiver component (RC) that sends and receives packets, respectively. Let $SC_i$ and $RC_i$ represent the sender component and the receiver component of network interface i, respectively.

Consider an arbitrary acyclic subgraph $\overline{G}$ of G. According to Lemma 1, with an LCN chosen for each switch interface, any arbitrary data packet flow pattern within each multicast packet switch in $\overline{S}$ can be achieved. Interconnection of these individual data packet flow patterns via the links in $\overline{L}$ constitutes a data packet flow pattern on $\overline{G}$. The flow direction on each link is determined by two individual data packet flow patterns at its ends. With a data packet flow pattern within each multicast packet switches being exemplified, link 3 has a bidirectional flow in FIG. 8(a) and a unidirectional flow in FIG. 8(c). The corresponding transmission matrices are given in FIG. 8(b) and FIG. 8(d).

[Lemma 2]: Given a $\overline{G}$, any data packet flow pattern constructed on $\overline{G}$ has the following properties:
a. Only a single LCN is associated with each link in $\overline{L}$.
b. The data packet flow pattern satisfies the weak sequencing (WS) condition, that is, point-to-point sequential packet transfer from any network interface in $\overline{E}$ to each of its receiving network interface(s) is guaranteed.

<Proof>: (a) is clear since, during the construction of a data packet flow pattern on $\overline{G}$, a common LCN can be chosen for the two switch interfaces at ends of each link in $\overline{L}$. (b) holds since each multicast packet switch has at least the weak sequencing property.

[Definition 3.2]:
a. Given a $\overline{E}$, the sending/receiving relationship among all network interfaces in $\overline{E}$ is represented by a N-by-N transmission matrix: $TM(\overline{E})$, where N is the number of network interfaces in $\overline{E}$. $TM(\overline{E})[i,j]$ is 1 if $RC_j$ receives packets from $SC_i$, and 0 otherwise.
b. Given two subsets X and Y of $\overline{E}$, the submatrix $TM(X,Y)$ is obtained from $TM(\overline{E})$ by retaining only those sender components in X and only those receiver components in Y. Let $TM(\overline{E}_{1,u},\overline{E}_{1,d})$ and $TM(\overline{E}_{1,d},\overline{E}_{1,u})$ be represented by $TM_{1,u,d}$ and $TM_{1,d,u}$, respectively.

Given a data packet flow pattern on $\overline{G}$, a $TM(\overline{E})$ can be easily obtained by tracing data packet flows from each network interface in $\overline{E}$.

By imposing different requirements on data packet flow patterns on $\overline{G}$, four flavors of multicast connections are defined.

[Definition 3.3]: Given a $\overline{G}$, a data packet flow pattern on $\overline{G}$ is a vanilla multicast connection, if it satisfies the multicast condition: There exists at least one network interface in $\overline{E}$ from which the packet stream is destined to two or more network interfaces in $\overline{E}$. These network interfaces are referred to as multicast sources (MSs). The representation $VMC(\overline{G})$ will be used to show the relationship between a vanilla multicast connection and its associated $\overline{G}$.

The multicast condition implies that: (1) At least one multicast packet switch in $\overline{S}$ will duplicate packets; and (2) The $TM(\overline{E})$, obtained from any $VMC(\overline{G})$, has at least one row containing two or more 1's. From this point on, only $TM(\overline{E})$'s having at least one row containing two or more 1's are considered. Given a $\overline{G}$, a $TM(\overline{E})$ with the weak sequencing condition may not be satisfied by a $VMC(\overline{G})$.

[Theorem 3.1]: Given a $\overline{G}$, a $TM(\overline{E})$ with the weak sequencing condition can be satisfied by a $VMC(\overline{G})$, if and only if it has the following VMC property: For any link 1 in $\overline{L}$, if $TM_{1,u,d}$ (or $TM_{1,d,u}$) contains two or more non-zero rows, these rows must be identical. In other words, every sender component in $\overline{E}_{1,u}$ (or $\overline{E}_{1,d}$) sending packets to the receiver components in $\overline{E}_{1,d}$ (or $\overline{E}_{1,u}$) must have identical destination subsets of $\overline{E}_{1,d}$ (or $\overline{E}_{1,u}$).

<Proof>: The sufficient condition is shown by contradiction. Assume that there exists a link 1 in $\overline{L}$ so that $TM_{1,u,d}$ contains different non-zero rows. This implies that there exist sender components $e_1$ and $e_2$ in $\overline{E}_{1,u}$ and receiver components $e_3$ and $e_4$ in $\overline{E}_{1,d}$ such that $TM(\{e_1, e_2\}, \{e_3,e_4\})$ is either FIG. 9(a) or (b). In FIG. 9(a), SC $e_1$ sends packets to both receiver component, $e_3$ and $e_4$, and SC $e_2$ only to RC $e_3$. In FIG. 9(b), SC $e_1$ only sends packets to RC $e_3$, and SC $e_2$ only to RC $e_4$. Since $\overline{G}$ is an acyclic graph, there exists a MPS s in $\overline{G}_{1,d}$ so that packet flows from SCs $e_1$ and $e_2$ will enter its switch interface A via link 1, as shown in FIG. 9(c), and packet flows destined to RCs $e_3$ and $e_4$ will leave from switch interfaces B and C, respectively.

With a single LCN associated with link 1, packets from SCs $e_1$ and $e_2$ will have the same LCN in their headers when they are sent over link 1. Since one LCN only indexes one entry in the packet translation table of switch interface A, packets with the same LCN cannot be duplicated and routed to different subsets of outgoing switch interfaces. Therefore, the desired data packet flow pattern within MPS s to support the submatrices in FIG. 9(a)-(b), can not be achieved. This implies that the TM($\overline{E}$) can not be implemented by any VMC($\overline{G}$). The above conclusion is also true when $TM_{1,d,u}$ contains different non-zero rows.

Next the necessary condition is proved. Let $E_{u,1}$ and $E_{u,2}$ (or $E_{d,1}$ and $E_{d,2}$) be two subsets of $\overline{E}_{1,u}$ (or $\overline{E}_{1,d}$), so that TM($E_{d,1}$, $E_{u,1}$) (or TM($E_{u,2}$, $E_{d,2}$)) contains all the 1's in $TM_{1,d,u}$ (or $TM_{1,u,d}$). The corresponding packet flow models of TM($E_{d,1}$, $E_{u,1}$) and TM($E_{u,2}$, $E_{d,2}$) are shown in FIG. 10, in which MPSs $s_1$ and $s_2$ both have pattern-1 data packet flow patterns. Let LCN n be chosen for link 1, then packets from each sender component in $E_{u,2}$ and $E_{d,1}$ will use LCN n when they are sent over link 1. To achieve these two data packet flow patterns, let the routing field in the switch header entry of the packet translation table at switch interface A (or SI B, resp.), indexed by LCN n, identify a set of outgoing links from which packets are transmitted to the receiver component in $E_{u,1}$ (or $E_{d,2}$).

Three natural vanilla multicast connections over the multicast packet switching network are given below.

a. Point-to-multipoint (Pattern-1): There is only one multicast source and each multicast packet switch in the vanilla multicast connection has pattern-1 data packet flow pattern.

b. Point-to-multipoint with upstream capability (Pattern-2): There is only one multicase source and each multicast packet switch in the vanilla multicast connection has pattern-2 data packet flow pattern.

c. Multipoint-to-multipoint (Pattern-3): In this vanilla multicast connection, each network interface is a multicast source and each multicast packet switch has pattern-3 data packet flow pattern.

Most data applications require reliable communication. To provide a network-based edge-to-edge reliable service to those multicast applications that require completely error-free transmission and that do not employ some higher-layer error control protocol, the multicast virtual circuit is introduced.

[Definition 3.4] : A multicast virtual circuit is a vanilla multicast connection which also satisfies the reliable condition: Point-to-point reliable packet transfer from any network interface to each of its receiving network interfaces is guaranteed.

There are two issues associated with a multicast virtual circuit.

1. Since a vanilla multicast connection may have multiple senders, a multipoint-to-multipoint error control protocol must be exercised among all network interfaces.

2. Given a TM($\overline{E}$) with the vanilla multicast connection properties, a VMC($\overline{G}$) can be set up to meet the desired information flow relationship among users. However, this VMC($\overline{G}$) is only concerned with transmission of data (or information) packets, and there may not exist paths in it for returning acknowledgements (ACKs).

One approach to address the second issue is described below. If the VMC($\overline{G}$) of a given TM($\overline{E}$) also provides paths for returning acknowledgements, it will be used to transmit both data and acknowledgements. Otherwise, a TM'($\overline{E}$) is obtained, where TM'($\overline{E}$)[i,j] is 1 if TM($\overline{E}$) [j,i] is 1. If the TM'($\overline{E}$) still has the vanilla multicast connection properties, a new VMC($\overline{G}$) is then set up to support the desired information flow relationship represented by the TM($\overline{E}$) and provide necessary acknowledgement paths. In both cases, some network interfaces may receive undesired data packets and/or acknowledgements. Therefore, two address fields—the addresses of the sending network interface and the receiving network interface—are reserved in the error control header so that each network interface can discard undesired incoming packets. The second field is used only by the acknowledgements.

A vanilla multicast connection and a multicast virtual circuit are not concerned with the sequencing relationship across multiple senders. Although most multicast applications can be supported by a vanilla multicast connection or a multicast virtual circuit, some multicast applications may request the multicast packet switching network to provide a multicast service which maintains the sequencing relationship across multiple senders. A strong multicast connection and a strong multicast virtual circuit are introduced to provide a network-based strong sequencing mechanism to those multicast applications that require strong sequential transmission and that do not employ some higher-layer strong sequencing protocol.

[Definition 3.5] : A vanilla multicast connection is a strong multicast connection, if it also satisfies the strong sequencing (SS) condition: the sequence of packet streams arriving at a set of network interfaces with two or more common multicast sources are identical with respect to the input streams from common multicast sources.

To investigate the relationship between transmission matrices with the strong sequencing condition and strong multicast connections, consider those transmission matrices which have the vanilla multicast connection properties stated in Theorem 3.1 and can be implemented by a vanilla multicast connection.

[Definition 3.6]:

a. Given a matrix, its two columns (or two rows) $\alpha$ and $\beta$ are said to be coupled, if column (or row) $\alpha$ contains at least two 1's at the same row (or column) position as column (or row) $\beta$.

b. A matrix with at least two coupled columns is said to have the strong coupling property, if its columns (or rows) can not be partitioned into two disjoint subsets such that there exists one column (or row) in each subset and these two columns (or rows) are coupled.

c. A TM($\overline{E}$) having the vanilla multicast connection property and at least two coupled columns is called a coupled transmission matrix and represented as CTM($\overline{E}$).

It is clear that for each non-CTM($\overline{E}$) with the vanilla multicast connection property, its associated VMC($\overline{G}$) is a SMC($\overline{G}$). From this point on, consider only CTM($\overline{E}$)s. The problem is summarized below.

[Problem 3.1]: Given a CTM($\overline{E}$), find the sufficient and necessary condition such that its associated VMC($\overline{G}$) is also a SMC($\overline{G}$).

Based on Definition 3.5, the strategy to solve Problem 3.1 is to find out all those subsets of receiver components which have respective two or more common sender components and then check the strong sequencing condition for each subset separately. By using the following partition method, a CTM($\overline{E}$) can be partitioned into a number of submatrices which have either no coupling property or the strong coupling property. Each submatrix corresponds to a partial packet flow of the associated VMC($\overline{G}$).

[CTM($\overline{E}$) Partition Method]: Let C be initialized to include all the columns of the CTM($\overline{E}$). The disjoint subsets $\{C_j j=0, \ldots, m (\geq=1)\}$ of C can be generated from the following steps as C shrinks to an empty set.

Assume that the subsets $C_1, \ldots, C_{j-1}$ are already non-empty and the subset $C_j$ is empty.

Step 1:
If C contains only one column, then move the remaining column from C to $C_o$. In any case, stop if C is empty. Otherwise go to Step 2.

Step 2:
Find a column with the largest number of 1's, say c, from C. Move c from C to $C_j$.

Step 3:
For each column c in C, repeat the following procedure:
{If there exists a column in $C_j$ so that these two columns have the coupling property, then move c from C to $C_j$.}

Step 4:
If $C_j$ contains only c, then move c from $C_j$ to $C_o$. Go back to Step 1.

Let $\overline{E}_{r,j}$ be the set of receiver components corresponding to those columns in $C_j$. Clearly, $\overline{E}_{r,o}, \ldots, \overline{E}_{r,m}$ are disjoint.

By using similar steps as those above, the rows of each submatrix $TM(\overline{E},\overline{E}_{r,j})$, $1 \leq j \leq m$, can be partitioned into a number of disjoint subsets $\{R_i i=0, \ldots, n (\geq 1)\}$. Let $\overline{E}_{s,i}$ represent the set of sender components corresponding to the rows in $R_i$ and $TM_{i,j}$ represent the submatrix $TM(\overline{E}_{s,i},\overline{E}_{r,j})$. Clearly, $\overline{E}_{s,o}, \ldots, \overline{E}_{s,n}$ are disjoint.

$C_o$ and $R_o$ may be empty; however, $C_1$ and $R_1$ always exist by the definition of $CTM(\overline{E})$. Based on Definition 3.5, it is clear that the strong sequencing condition of the $CTM(\overline{E})$ is satisfied, if and only if the strong sequencing condition of each submatrix obtained in the partition algorithm is satisfied. Since $TM(\overline{E},\overline{E}_{r,o})$ and $TM_{o,j}$, $1 \leq j \leq m$, if they exist, do not have the coupling property, the packet flows corresponding to these submatrices are ignored while the strong sequencing condition of the $CTM(\overline{E})$ is checked. However, each $TM_{i,j}$, $1 \leq i \leq n$, $1 \leq j \leq m$, has the strong coupling property. Therefore, to deal with Problem 3.1, consider these $TM_{i,j}$, $1 \leq i \leq n$, $1 \leq j \leq m$, and deal with their strong sequencing conditions separately. Note that each $TM_{i,j}$ has the vanilla multicast connection property since the $CTM(\overline{E})$ does. Depending on the type of multicast packet switches, the sufficient and necessary condition that the strong sequencing condition of a $TM_{i,j}$ can be satisfied will be different. The following definition is needed for describing the main results which are summarized in Theorem 3.2 and Theorem 3.3.

[Definition 3.7]: Any link l in $\overline{L}$ cuts $\overline{G}$ into two disjoint subgraphs $\overline{G}_{l,u}$ and $\overline{G}_{l,d}$. Let $\overline{E}_{s,i,l,u}$ and $\overline{E}_{s,i,l,d}$ contain those sender components in $\overline{G}_{l,u}$ and $\overline{G}_{l,d}$, respectively. Also, let $\overline{E}_{r,j,l,u}$ and $\overline{E}_{r,j,l,d}$ contain those receiver components in $\overline{G}_{l,u}$ and $\overline{G}_{l,d}$, respectively.

[Theorem 3.2]: Assume all the multicast packet switches are w-MPSs. For any given $TM_{i,j}$, $1 \leq i \leq n$, $1 \leq j \leq m$, its strong sequencing condition can be satisfied, if and only if, there exists an inter-MPS link in $\overline{L}$ such if all the sender components in $\overline{E}_{s,i}$ are in $\overline{G}_{l,u}$ (or $\overline{G}_{l,d}$), then all the receiver components in $\overline{E}_{r,j}$ must be in $\overline{G}_{l,d}$ (or $\overline{G}_{l,u}$).

<Proof>: Since w-MPSs only have the weak sequencing property, it is clear that the strong sequencing condition among the receiver components in $\overline{E}_{r,j}$ can be satisfied if and only if these receiver components receive packets via a single link, where all packet streams originating from the sender components in $\overline{E}_{s,i}$ are multiplexed into a single interleaved packet stream. In this case, the value of each element in $TM_{i,j}$ is 1, since $TM_{i,j}$ has the vanilla multicast connection property and the strong coupling property.

[Theorem 3.3]: Assume all the multicast packet switches are s-MPSs. For any given $TM_{i,j}$, $1 \leq i \leq n$, $1 \leq j \leq m$, its strong sequencing condition can be satisfied, if and only if, for any inter-MPS link l in $\overline{L}$, there do not exist a sender component and a receiver component in $\overline{G}_{l,u}$ and a sender component and a receiver component in $\overline{G}_{l,d}$ such that these two receiver components have these two sender components as common multicast sources. In other words, there do not exist four respective non-empty subsets, say $\hat{E}_{s,i,l,u}$, $\hat{E}_{s,i,l,d}$, $\hat{E}_{r,j,l,u}$ and $\hat{E}_{r,j,l,d}$, of the sets $\overline{E}_{s,i,l,u}$, $\overline{E}_{s,i,l,d}$, $\overline{E}_{r,j,l,u}$ and $\overline{E}_{r,j,l,d}$, such that the value of each element in $TM(\{\hat{E}_{s,i,l,u},\hat{E}_{s,i,l,d}\}, \{\hat{E}_{r,j,l,u},\hat{E}_{r,j,l,d}\})$ is 1.

<Proof>: When the sender components in $\overline{E}_{s,i}$ and the receiver components in $\overline{E}_{r,j}$ are connected to the same multicast packet switch, the claim is true since the s-MPS has the strong sequencing property. Therefore, it suffices to prove the case when the sender components in $\overline{E}_{s,i}$ and the receiver components in $\overline{E}_{r,j}$ are not connected to the same multicast packet switches. Since $TM_{i,j}$ has the vanilla multicast connection properties, FIG. 11(a) depicts an equivalent two-MPS model with respect to each inter-MPS link l. Multicast packet switches 1 and 2 represent the two multicast packet switches which link l connects. The sender components in $\overline{E}_{s,i,l,u}$ and the receiver components in $\overline{E}_{r,j,l,u}$ are connected to multicast packet switch 1, and the sender components in $\overline{E}_{s,i,l,d}$ and the receiver components in $\overline{E}_{r,j,l,d}$ are connected to multicast packet switch 2.

The packet flow model corresponding to $TM(\overline{E}_{s,i},\overline{E}_{r,j,l,u})$ is shown in FIG. 11(b). This is equivalent to the case that the sender components in $\overline{E}_{s,i}$ and the receiver components in $\overline{E}_{r,j,l,u}$ are all connected to multicast packet switch 1, and therefore, the strong sequencing condition among the receiver components in $\overline{E}_{r,j,l,u}$ with respect to the common sender components in $\overline{E}_{s,i}$ is satisfied. Similarly, by removing $\overline{E}_{r,j,l,u}$, $\overline{E}_{s,i,l,d}$ and $\overline{E}_{s,i,l,u}$ from FIG. 11(a), respectively, the strong sequencing condition among the receiver components in $\overline{E}_{r,j,l,d}$ with respect to the common sender components in $\overline{E}_{s,i}$, the strong sequencing condition among the receiver components in $\overline{E}_{r,j}$ with respect to the common sender components in $\overline{E}_{s,i,l,u}$, and the strong sequencing condition among the receiver components in $\overline{E}_{r,j}$ with respect to the common sender components in $\overline{E}_{s,i,l,d}$ are also satisfied. Therefore, the only remaining case to check is when there exists at least one element in each of the four sets—$\overline{E}_{s,i,l,u}$, $\overline{E}_{s,i,l,d}$, $\overline{E}_{r,j,l,u}$ and $\overline{E}_{s,i,l,u}$, such that these receiver components have these sender components as common multicast sources.

The necessary condition is proved first. For any inter-MPS link l in $\overline{L}$, suppose there do not exist a sender component and a receiver component in $\overline{G}_{l,u}$ and a sender component and a receiver component in $\overline{G}_{l,d}$ such that these two receiver components have these two sender components as common multicast sources. This implies that the above remaining case does not exist. Therefore, the strong sequencing condition of the $TM_{i,j}$ is satisfied. Next, the sufficient condition is proved by contradiction. Consider FIG. 11(c), in which sender component A, sender component B, receiver component C and receiver component D are in $\overline{E}_{s,i,l,u}$, $\overline{E}_{s,i,l,d}$, $\overline{E}_{r,j,l,u}$ and $\overline{E}_{r,j,l,d}$, respectively, and sender components A and B are common multicast sources to receiver components C and D. If each of sender components A and B sends a packet to receiver components C and D at the same time, then receiver component C (or receiver component D) will receive the packet from sender component A (or sender component B) first. Therefore, receiver components C and D will not receive identical interleaved packet streams.

[Definition 3.8]: A strong multicast virtual circuit is a strong multicast connection which also satisfies the reliable condition: a set of network interfaces with two or more common multicast sources will receive identical interleaved packet streams with respect to the input streams from common multicast sources.

By executing multidestination error control among all network interfaces in a strong multicast connection, some retransmitted packets may exist. Without other means, each receiver component may put an original packet and a retransmitted packet coming from different multicast sources into different order, and the strong sequencing condition is violated. To solve this problem, each packet in a strong multicast virtual circuit carries a global time stamp. Time-stamp ordering assures that the strong sequencing condition among all the receiver components in a strong multicast virtual circuit is satisfied.

Various flavors of multicast connections provide various kinds of multicast services to users. A multicast application (MA) is an end-user's use for a multicast service or a collection of multicast services. To achieve service integration, a multicast application is viewed by the users as an integrated service.

The single-media multicast applications, such as multi-destination file transfer, voice conferencing, etc, are generally supported by a suitable flavor of multicast connection. However, for those multimedia multicast applications (MMAs) involving two or more media, they may or may not be supported by a single multicast connection. Consider a multi-party interactive debugger. Two different scenarios are shown in FIG. 12 and FIG. 13, respectively. Each multimedia workstation (MMWS) contains a terminal (e.g. T1) and a voice bridge (VB) and is connected to a separate network interface. In FIG. 12, the editor program used for file debugging is a network server in an intelligent server node (ISN). Multiple multicast connections are used. The dashed lines interconnecting the editor program and the three terminals represent a pattern-2 multicast virtual circuit with the intelligent server node as the multicast source; the dotted lines interconnecting the three voice bridges represent a pattern-3 vanilla multicast connection. In FIG. 13, the editor program resides in multimedia workstation 1. As before, the users can request multiple multicast connections to support the multimedia multicast applications; or as an alternative, the users may request a single pattern-3 vanilla multicast connection for both data and voice. The latter results in a multimedia multicast connection, in which two media share the same logical channel number and are distinguished by different channel numbers. Its advantage is that the connection setup is done only once. Since the data are also sent via the pattern-3 vanilla multicast connection, multimedia workstation 3 (or multimedia workstation 2) needs to discard those incoming editor-program-destined editor commands generated at multimedia workstation 2 (or multimedia workstation 3). This data-packet-discarding is efficiently implemented in hardware. Multidestination error control for reliable data is executed at the multimedia workstations rather than the network interfaces. The voice sharing the same multicast connection with the other media shows an advantage of using distributed voice bridges.

In summary, the number of multicast connections needed to support a given multimedia multicast application generally depends on the location of servers and their relationships. For the local servers, such as the editor program and the voice bridges in FIG. 13, residing in the multimedia workstations, a single multicast connection or multiple multicast connections can be requested to support the communication among them. For the network servers, residing in the network interfaces or the intelligent server nodes, their locations are generally transparent to the users. Therefore, the users may need to request a separate multicast connection for each independent network-based service.

MULTICAST CONNECTION TRANSFORMATION

In the most general sense, a multiparty connection consists of a set of information streams linked together to provide a specified type of connectivity. A multiparty connection can be specified using two parameters: the number of endpoints in the connection and the structure of the information streams that flow between these endpoints. Theoretically, there are a very large number of arbitrary connection structures, however, for practical reasons only a small number of these can be supported in a given implementation. Thus, a select few of multiparty types are defined that provide the most likely types to be used in popular applications.

Once the structure of a connection is clearly defined, an understanding of how to change the connection structure is needed. This restructuring can be described as a transformation from a set of original connections to a set of target connections. These changes are a result of user operations on a connection by, for example, adding a new endpoint to a connection, dropping an endpoint from a connection, or adding one new endpoint to a connection and deleting another endpoint. Other more sophisticated operations include combining multiple connections into a single connection (merging), separating a single connection into multiple connections (splitting), changing a connection type or combinations of all of these.

The method described herein relates to the restructuring of connections when operations are requested. Before this model is described, though, some background information is provided.

Two fundamental capabilities needed to support multiparty connections are multicasting and funneling. When multicasting, an information stream is established from one source to multiple arbitrary destinations. When funneling information streams, multiple sources of information are sent to a single destination. The hardware needed to provide these different types of information streams can be supported in a variety of ways. Traditional methods of supporting multiparty voice or data connections use a centralized bridge within a network of switches. Using this method, all participants establish point-to-point connections to a centralized bridge where the multicasting and funneling capabilities are provided. This approach is identified as transport layer multicasting. With a packet switch, the multicasting and funneling capabilities can be supported within the switching fabric itself. With appropriate software control, network layer multicasting connections are supported. The model presented herein assumes the network layer multicasting approach to support multi-party connections.

Figure 14:
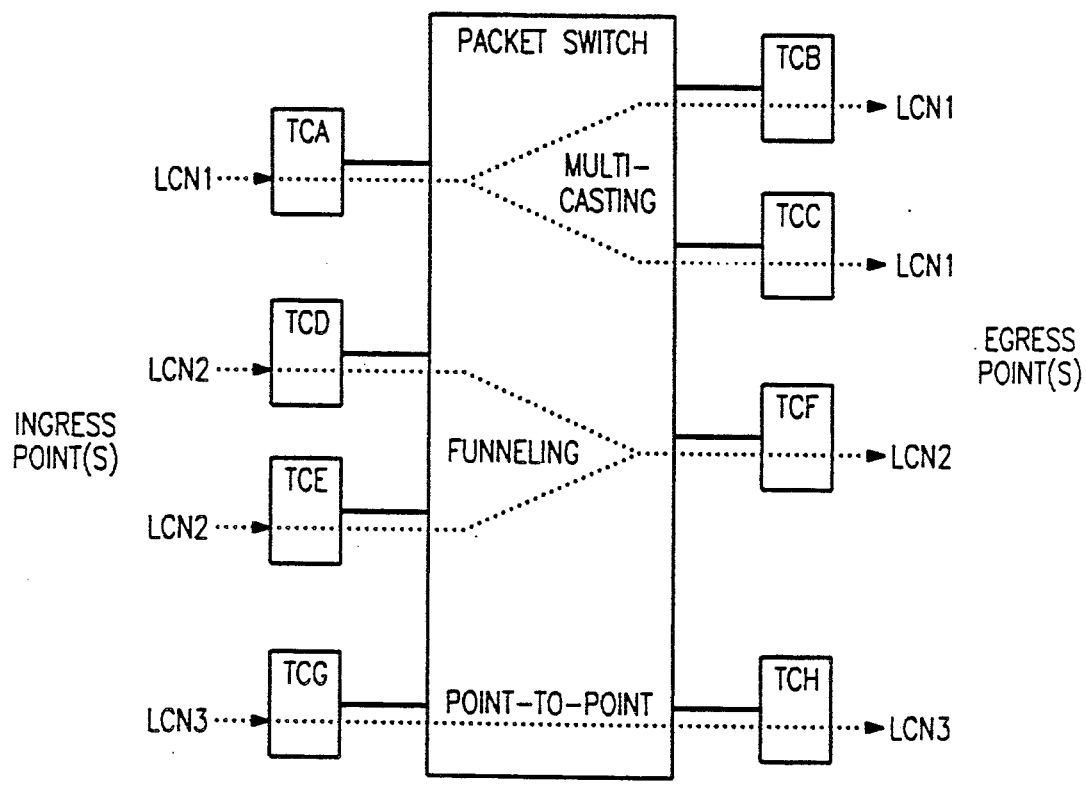
FIG. 14 is a diagram illustrating packet streams of three types in a multicast packet switch.

In FIG. 14, the components of a single packet switch are shown: an ingress trunk controller (ITC), an egress trunk controller (ETC), and a wideband packet switch. The ITC provides the routing translation function to route packets through the packet switch. The ITC translates a given logical channel number (LCN) into one or more TC numbers and the packet switch uses these TCs to route packets to ETCs. To support a multicasting capability, the packet switch supports packet replication.

Packet information streams are overlaid on the TCs and packet switch which represent the flow of packets from ingress to egress points (or TCs). Three important streams are identified: a multicasting stream, a funneling stream and a point-to-point stream. The multicasting stream sends packets from a single ingress TC to an arbitrary set of egress TCs using a single LCN. The funneling stream sends packets from multiple ITCs to a single ETC. Contention for the same ETC is resolved by the packet switch. And the point-to-point stream sends packets from a single ITC to a single ETC.

The smallest atomic stream—a stream from a single source ITC to a single destination ETC—is referred to as a path. As an example, multicasting streams and funneling streams contain multiple paths. In FIG. 14, the multicasting stream consists of two paths: one from TCA to TCB and one from TCA to TCC. The funneling stream consists of two paths also: one from TCD to TCF and one from TCE to TCF. The point-to-point stream consists of one path: from TCG to TCH. In the following description, a path is a useful component of the connection transformation model.

With the basic capabilities of multicasting, funneling and point-to-point streams provided in a packet switch, multiparty connections may be constructed within a network of packet switches.

Figure 15A:
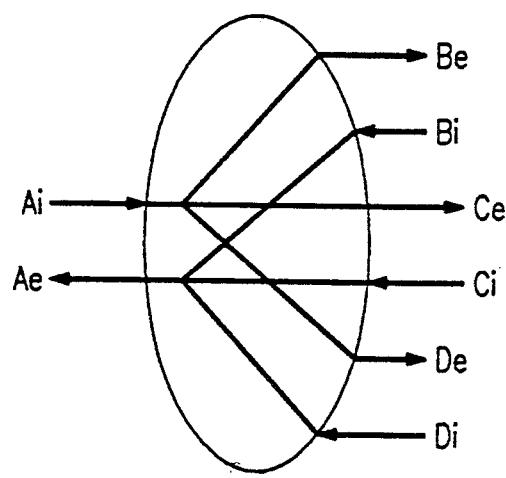
FIG. 15a and FIG. 15b are diagrams used to introduce the logical and physical representations of a connection

A logical connection is defined as the user's specification of a multiparty connection. This can also be thought of as the subnet's view of the connection where each access label, A, B, C and D in FIG. 15a, has an ingress point and an egress point defined (e.g., Ai-ingress point, Ae-egress point).

Figure 15B:
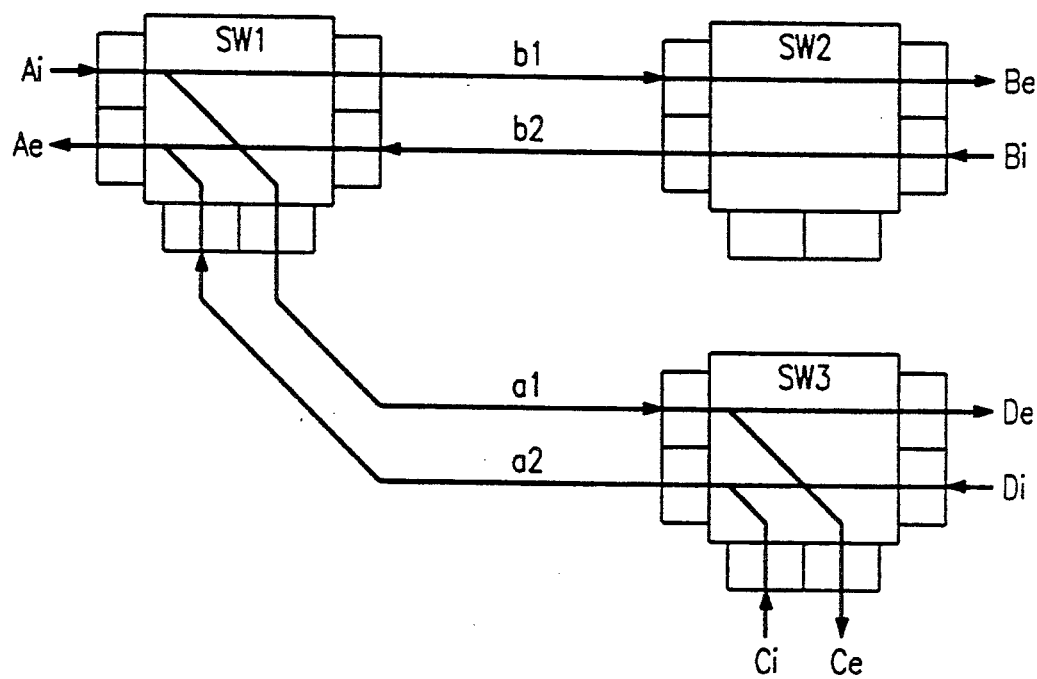

A physical connection is a distributed implementation of the logical connection onto an arbitrary network configuration (FIG. 15b). The subnet's view of the logical connection is preserved while the actual connection streams are distributed across multiple switches (SW1, SW2 and SW3). A routing function is used to set up the physical connection given the logical connection and an arbitrary network configuration. The routing function is based on a breadth first search (BFS) tree superimposed on the arbitrary network. An important idea to note is that all logical connections cannot be superimposed onto any arbitrary network configuration.

In FIG. 15b, unique labels are used to identify the individual paths within each of the switches. The subnet labels (e.g. Ai, Bi) are equivalent to the logical connection while the internal labels (eg. a1, b1) identify points of path interconnection within the network.

It is important to note that the user only understands the logical connection view and has no knowledge of how the connection is implemented on an arbitrary network. When requesting changes to existing connections, the user also only understands the logical view. The network control software, on the other hand, is responsible for translating this logical view into a physical implementation.

To build a basis for our transformation model, a physical connection (FIG. 15b) is represented in a graphical form using a matrix (FIG. 16). The matrix is constructed by identifying ingress and egress points on the physical connection with unique labels (eg. Ai, B1, etc. in FIG. 15b). This, in effect, allows identification of all paths within the physical connection.

A matrix is then constructed with all ingress points in rows and all egress points in columns. Because all internal labels can be ingress and egress points, they appear in both rows and columns. An entry in the matrix represents a single path from ingress point to egress point.

Two different types of path entries are identified: existing paths and possible paths. The matrix is populated by placing a '1' in a position which represents an existing path from access to egress and a '0' is placed in a position which represents a possible path or a path that could be used in the connection but is not. An existing path might be "Ai" to "b1" (cf. FIG. 15b and FIG. 16), while a possible path would be "b2" to "a1". Since all possible paths are identified with either '0s' or '1s', this matrix represents the complete set of paths required to fully connect subnet points A,B,C and D.

An interesting observation to note is that rows of a matrix with '1s' in them describe the set of paths that make up a multicasting stream and columns of a matrix with '1s' in them describe the set of paths that make up a funneling stream. Rows or columns with a single '1' in them represent a point-to-point stream.

This representation can be extended in a distributed fashion as in FIG. 17 where each switch has its own matrix. This will be useful to make the solution to this problem more practical.

Figure 18:
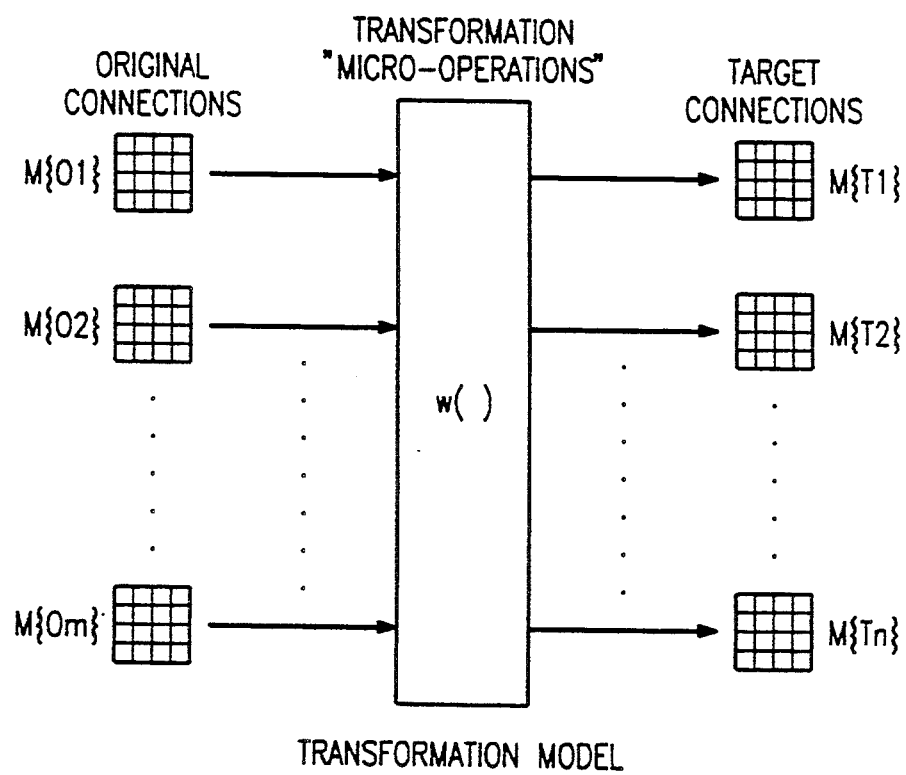
FIG. 18 is a diagram illustrating the general method of network transformation.

The basic problem addressed is how to transform a set of original connections into a set of target connections as depicted in FIG. 18. The goal of this transformation is to realize the implementation of user operations like, adding a party, merging multiple connections, splitting a single connection and others. The first assumption made is that the original connection(s) exist and the user specifies the target connection(s) that should exist after the transformation. When the user specifies the target connections, the user operations are implicitly defined in the target connection. For example, when adding a party to a connection the target connection contains the new party while the original connection does not.

Users specify connections in a logical form and network control translates the logical form into a physical form based on an arbitrary network configuration. Assume in this analysis that the connections are in their physical form and that the translation from logical to physical has already taken place.

The fundamental problem to be solved is to get to a target configuration from an original configuration. One solution to this problem is to destroy the original connections and create new target connections. This solution requires the most transformation processing as all connection paths (original and target) have to be modified. The preferred solution described herein takes advantage of reusing connection paths of an original physical connection to reduce transformation processing. By predicting a priori which connection paths can be reused, which must be added, or which must be deleted from the original connection, the transformation processing can be reduced. This is the approach taken in solving this problem.

Figure 19A:
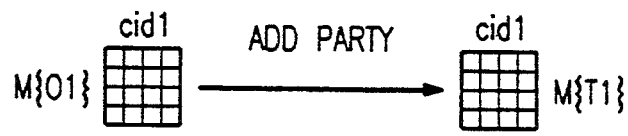
FIG. 19a–FIG. 19c are diagrams illustrating the network transformation in three specific cases.
Figure 19B:
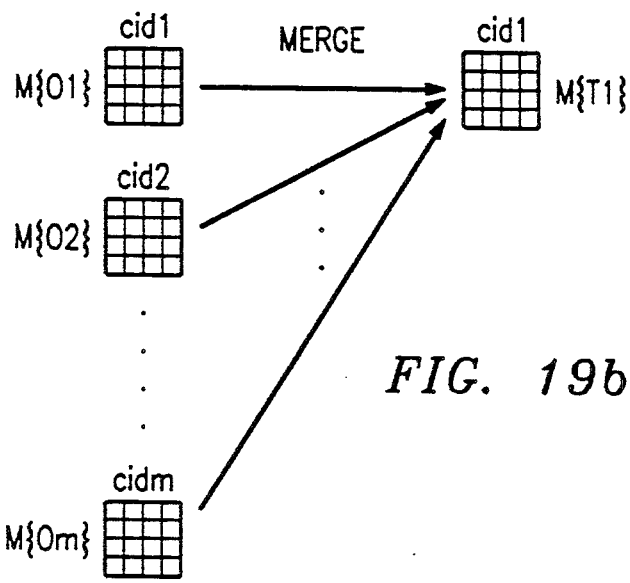
Figure 19C:
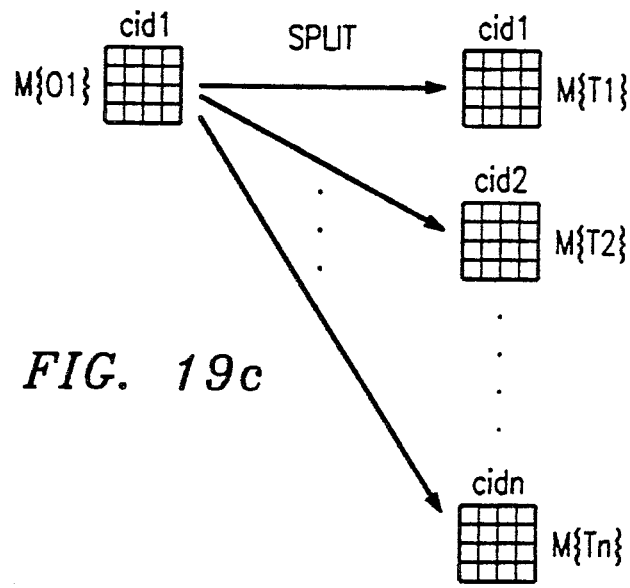

Physical level connection transformation might be of several different forms: (a) one-to-one, (b) many-to-one, (c) one-to-many, and (d) many-to-many. An example of a one-to-one transformation might be adding a party to a connection since one original connection is transformed into one target connection (FIG. 19a). An example of a many-to-one transformation might be the merging of multiple connections into a single connection as shown in FIG. 19b. And finally, an example of a one-to-many transformation might be the splitting of a single connection into multiple different connections as shown in FIG. 19c. Many-to-many transformation is also possible; the following analysis can be extended to handle this case.

An important aspect to this solution when attempting to reuse connection paths is to identify which original or target connection to reuse. This is done by associating the same connection identifier (CID) with one original connection and one target connection. A connection identifier (CID) is used here as a way of naming connections. In an implementation, the CID would be the way network control software would identify connections. In the one-to-one transformation case, this is done by default as there is only one original and one target connection (FIG. 19a). For the many-to-one transformation case, one of several CIDs can be associated with one target CID (FIG. 19b). And for the one-to-many transformation case, one original CID can be associated with one of several target CIDs (FIG. 19c). In the latter two cases this association can be made arbitrarily or based on an intelligent prediction. An example might be to compare all original and target connections to find one of each that are the most similar in order to minimize the processing needed to perform the transformation.

As described earlier, user operations, like adding a party, merging connections etc. . ., are operations requested by the user and are defined at the logical connection level. Physical level connection operations or micro-operations are sub-operations used to implement a given user operation. In a Von Neumann computer, for example, a single instruction like a register transfer, requires several gate level micro-instructions to realize. In a similar sense, a single user operation, like adding a party, may require several micro-operations, like adding several connection paths to a physical connection. The two micro-operations we consider are:

add_connection_path (connection,path[i,j]) (which adds a connection path to a given connection)
    delete_connection_path (connection,path[i,j]) (which removes a connection path from a given connection)

These micro-operations can be used to realize the most primitive operations at the physical level. Determining the appropriate set of micro-operations needed for a given transformation is the problem solved herein.

The problem is solved by first (1) determining what micro-operations are needed, and second (2) executing these micro-operations to transform the original connection(s). The process of determining the micro-operations needed is the subject of the following section.

The solution to this problem is based on set theory. The idea is that a connection can be represented in graphical form as a matrix of existing and possible connection paths within an arbitrary network as described earlier. With the user's specification of the target connection(s), (assuming the original connection(s) exist) the micro-operations to realize the transformation can be determined by creating matrix subsets based on the original and target connection(s). The easiest way to describe this is with a series of examples and generalize this process at the end. The first example is a one-to-one transformation.

Consider a determination of the set of micro-operations needed to realize adding a party (party "C") to an original connection while deleting another party (party "D"). In FIG. 1a and FIG. 1b, original and target connections are shown in their physical form; FIG. 1c and FIG. 1d give the matrix form. Adding a party requires the addition of two connection paths, "{Ci to a2} and {a1 to Ce}", associated with party "C". Deleting a party requires the deletion of two connection paths, "{Di to a2} and {a1 to De}", associated with party "D".

Figures 2A, 2B, 2C, 2D, 2E:
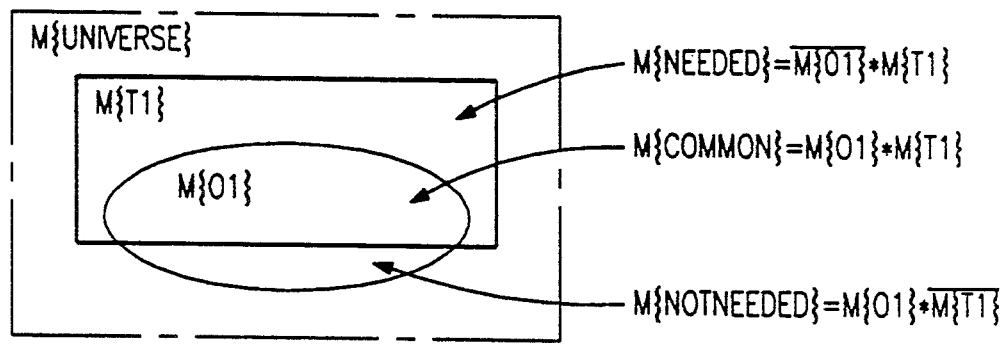
FIG. 2a is a Venn diagram showing the relationship among four matrices used in the network transformation method of the invention.
FIG. 2b–FIG. 2e are matrix representations of the four matrices defined in FIG. 2a and obtained from the original and target connection matrix representations of FIG. 1c and FIG. 1d.

In FIG. 2a, a Venn diagram is shown that describes how connection paths overlap between an original connection, M{O1}, and a target connection, M{T1}. Each of the different areas in this diagram represent subsets of connection paths. Three important matrix subsets are identified in this diagram: M{common}, M{needed} and M{notneeded}. Each of these are obtained by logical operations on matrices M{O1} and M{T1} as shown in the equations of FIG. 2a. M{common} represents the set of all connection paths that are common to both the original connection and the target connection. M{needed} represents the connection paths that are needed to realize the target connection but are not in the original connection. And M{notneeded} represents the connection paths that exist in the original connection but not in the target. M{universe} represents the set of all existing and possible connection paths for the union of all parties involved.

Examining the matrix subsets in FIG. 2d. M{notneeded} in FIG. 2d contains the two connection paths "{Di to a2} and {a1 to De}", which means that those connection paths must be deleted from the original connection to realize the target. M{needed} in FIG. 2c contains the connection paths "{Ci to a2} and {a1 to Ce}", which means that these two connection paths must be added to the original connection to realize the target. And finally, M{common} in FIG. 2e represents all connection paths that can be reused from the original to realize the target.

From these matrix subsets, the set of micro-operations can be determined based on the method shown in Table 1. Every connection path that exists in M{needed} must be added to the original connection, M{O1}. Every connection path that is in M{notneeded} must be removed from M{O1}. No operations are needed for the connection paths that are in both original and target (or M{common}). This method (Table 1) results in the execution of four micro-operations—two add_connection_path operations and two delete_connection_path operations.

TABLE 1

One-to-One Transformation if((m==1)&&(n==1)){/*ONE-TO-ONE TRANSFORMATION*/
for (all connection paths in M{needed})

TABLE 1-continued

One-to-One Transformation

```
        add_connection_path(M{O1},path[i,j]);
    for(all connection paths in M{notneeded})
        delete_connection_path(M{O1},path[i,j]);
    for(all connection paths in M{common})
        reuse_path(M{O1});
}
```

TABLE 2

Many-to-One Transformation

```
if(m>n){            /*M-TO-ONE TRANSFORMATION*/
    /*operate on original connection*/
    for(all connection paths in M{needed})
        add_connection_path(M{O1},path[i,j]);
    for(all connection paths in M{notneeded})
        delete_connection_path(M{O1},path[i,j]);
    for(all connection paths in M{common})
        reuse_path(M{O1});
    /*operate on remaining connections*/
    for(all 'm-1' remaining connections)
        for(all connection paths in M{Om})    /*delete old connection M{Om}*/
            delete_connection_path(M{Om},path[i,j]);
}
```

TABLE 3

Many-to-One Transformation

```
if(n>m){            /*ONE-TO-N TRANSFORMATION*/
    /*operate on original connection*/
    for(all connection paths in M{needed})
        add_connection_path(M{O1},path[i,j]);
    for(all connection paths in M{notneeded})
        delete_connection_path(M{O1},path[i,j]);
    for(all connection paths in M{common})
        reuse_path(M{O1});
    /*operate on remaining connections*/
    for(all 'n-1' remaining connections)
        for(all connection paths in M{Tn})    /*create new connection M{Tn}*/
            add_connection_path(M{Tn},path[i,j]);
}
```

Another similar example using the same analysis is the user operation of changing a connection type. An original connection (FIG. 20a), which is a multipoint-to-multipoint multicast connection, is transformed into a target connection (FIG. 20b), which is point-to-multipoint with unstream capability. In this example, connection paths within the original connection must be deleted to get to the target connection. Again, matrix subsets are generated and the following micro-operations are executed in Table 1:

delete_connection_path (M{O1}, path[Ci, De]);
delete_connection_path (M{O1}, path[Di, Ce]);
delete_connection_path (M{O1}, path[a2, b1)9 );
delete_connection_path (M{O1}, path[b2, a1]);

It should be noted that because of the generality of this model, any arbitrary transformation is possible.

The next example described combines two original connections into one target connection; an example of a many-to-one transformation where "many" is equal to two. Two original connections and one target connection are shown in their physical forms in FIG. 21a-FIG. 21c. FIG. 22a-FIG. 22c show the matrix forms of these connections respectively. Original connection 1 is a multipoint-to-multipoint multicast connection between parties A, B and C, while original connection 2 is a multipoint-to-multipoint multicast connection between parties A, D and E. The target connection is the same type between all parties A, B, C, D and E.

The approach taken to implement a many-to-one transformation is to select a single original connection (from a set of many originals) and transform this original into the target. The remaining original connections are removed completely. A common CID is selected to identify the original and target connections that will be transformed. When selecting a common CID, it is desirable to select an original connection that is very similar to the target so that a minimal set of micro-operations are needed to transform the connection. Note that our analysis does not depend on which original connection is selected; any of the originals can be transformed into the target, however, there exists at least one original that can be transformed with a minimal number of micro-operations. In the present example, the first original connection, M{O1}, is arbitrarily selected.

Figures 23A, 23B, 23C, 23D, 23E:
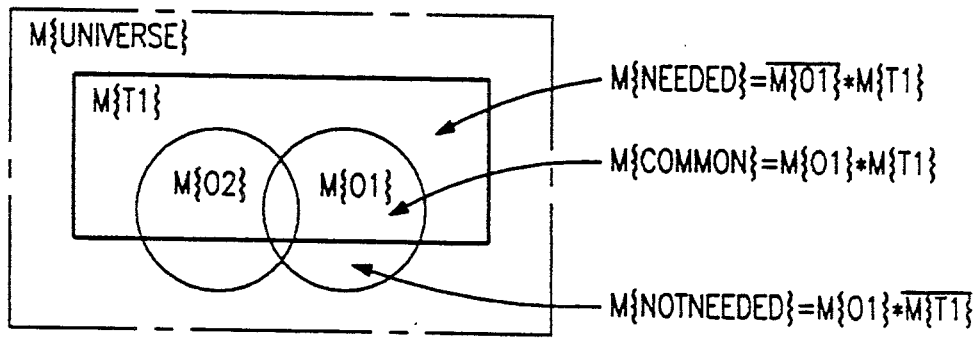

Again a Venn diagram is used to explain the transformation process (FIG. 23a). In FIG. 23b-FIG. 23e, the matrix subsets are generated similar to the previous example. Note that the connection M{O2} is not used to generate the matrix subsets. This is because this connection will be entirely deleted while connection M{O1} will be transformed into the target.

M{needed} in FIG. 23c shows eight connection paths needed to transform M{O1} to the target. M{notneeded} is the empty set as all connection paths in the original connection exist in the target. And finally, M{common} represents the connection paths that are reused across the transformation which is equivalent to M{O1} as all connection paths existing in M{O1} exist in the target connection.

From these matrix subsets, the set of micro-operations can be determined based on the method of Table 2 (with m=2). Every connection path that exists in M{needed} must be added to the original connection, M{O1}. Every connection path that is in M{notneeded} must be removed from M{O1}. Every connection path that is in both original and target (or M{common}) is preserved across the transformation. Also the entire connection M{O2} is deleted since M{O1} is the only connection that should exist after the transformation.

The example just described can be reversed to handle the case of a one-to-many transformation. This is done by switching the original and target matrices to have one original matrix, M{O1}, and two target matrices, M{T1} and M{T2}. In this new example, M{O1} is again transformed into M{T1} and, in this case, instead of deleting M{O1}, M{T2} is added.

The same matrix subsets can be computed but with different meanings. M{needed} now represents all connection paths that are not needed to get to the two target connections and thus must be removed. M{notneeded} now represents the connection paths that must be added to the original to get to the target. M{common} still represents all connection paths that can be reused through the transformation.

A generalized solution to this problem is summarized based on the previous examples: one-to-one, many-to-one and one-to-many transformations. A two step process is used to solve the transformation problem. The first step is to compute the matrix subsets based on one original and one target connection selected for transformation. These matrix operations are summarized here:

M{needed} = M{O1} * M{T1}
M{notneeded} = M{O1} * M{T1}
M{common} = M{O1} * M{T1}

The next step is to determine the micro-operations needed to realize the transformation. The one-to-one transformation case, is described in Table 1. For the many-to-one case, (the m-to-one case), the original connection is transformed and then the remaining m-1 connections are deleted (Table 2). For the one-to-many case, (the one-to-n case), we first transform the original connection is transformed and then the remaining n-1 connections are added (Table 3). Once the micro-operations are determined they can be executed and the transformation is complete.

The description thus far has included adding and dropping a party from a given connection, merging and splitting connections and changing connection types. It should be noted that it is also possible to combine these high-level user operations. For example, consider merging multiple connections into a single connection and at the same time changing its connection type, merging and adding or deleting a party at the same time, or splitting a single connection and adding or deleting a party. The transformation model developed here supports these arbitrary operations because it is based on the smallest object of a communication stream—a connection path. In practical applications though, the specification of these operations by the user becomes the limit in the implementation of these complex operations.

The examples described thus far are based on a centralized view of a connection as shown in FIG. 16. It should be noted that this analysis can be extended to solve these problems in a distributed way using the distributed connection representation of FIG. 17. A distributed solution is more practical to implement in a network of distributed switches.

The protocol used to implement the distributed solution would also allow parallel processing of connection transformation. An example of this protocol is as follows. First a message is sent to the first switch which contains a description of the original and target connection. Within this message is a description of the original and target connections. The switch control software computes each matrix subset based on this information. Next, the micro-operations are determined and executed based on the matrix subsets just generated. And finally, a new message is forwarded to each of the next switches and the process continues. The example that follows illustrates a computation of the matrix subsets for the distributed solution. Other implementations may not use matrices to manipulate but rather some other more efficient data structure. Matrices have been used in this description simply as a convenient way to represent a connection.

Figure 21A:
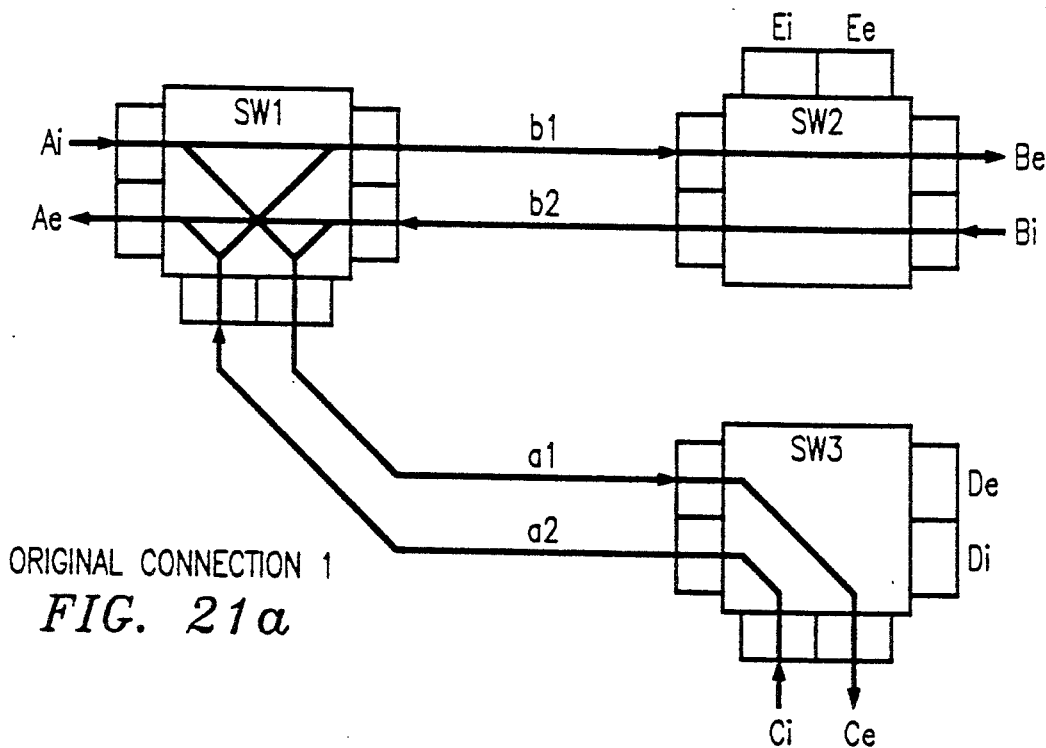
Figure 21B:
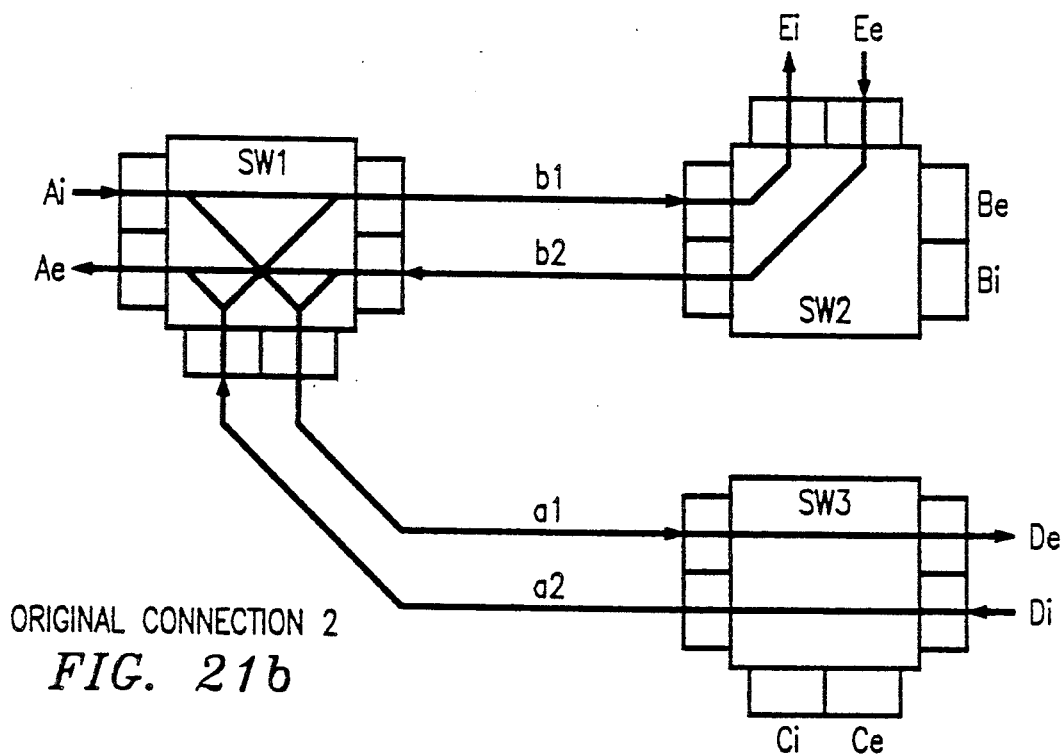
Figures 21C, 22A, 22B, 22C:
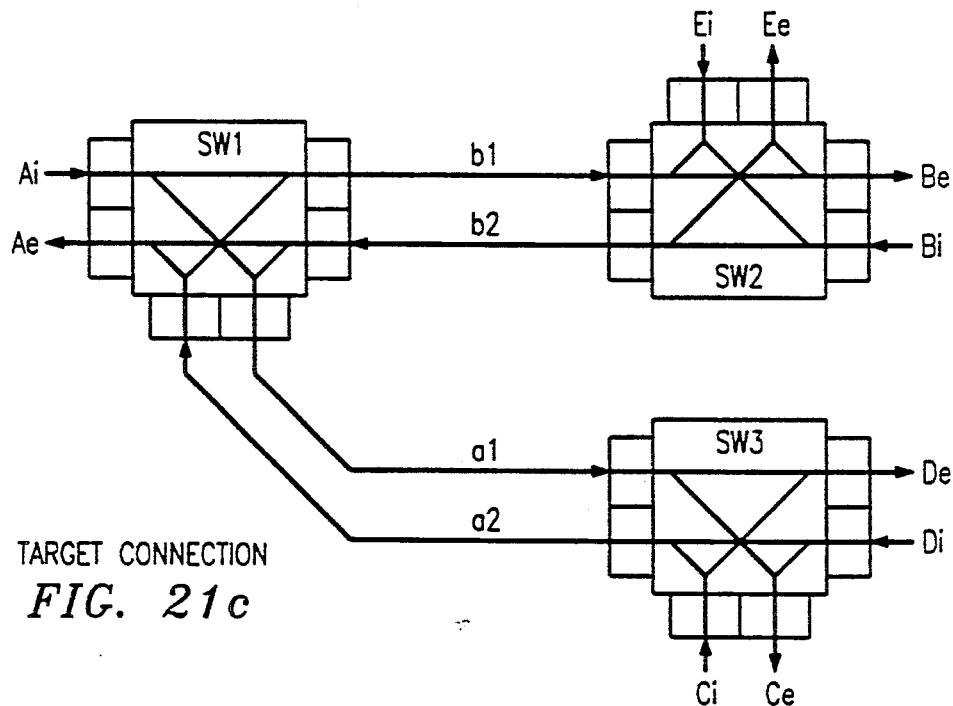

The example described here corresponds to the example described earlier concerning splitting a single connection into two target connections—it is the reverse of the operations of FIG. 21a–FIG. 21c. The following is a solution to this example based on a distributed connection representation.

Figures 24A, 24B, 24C:
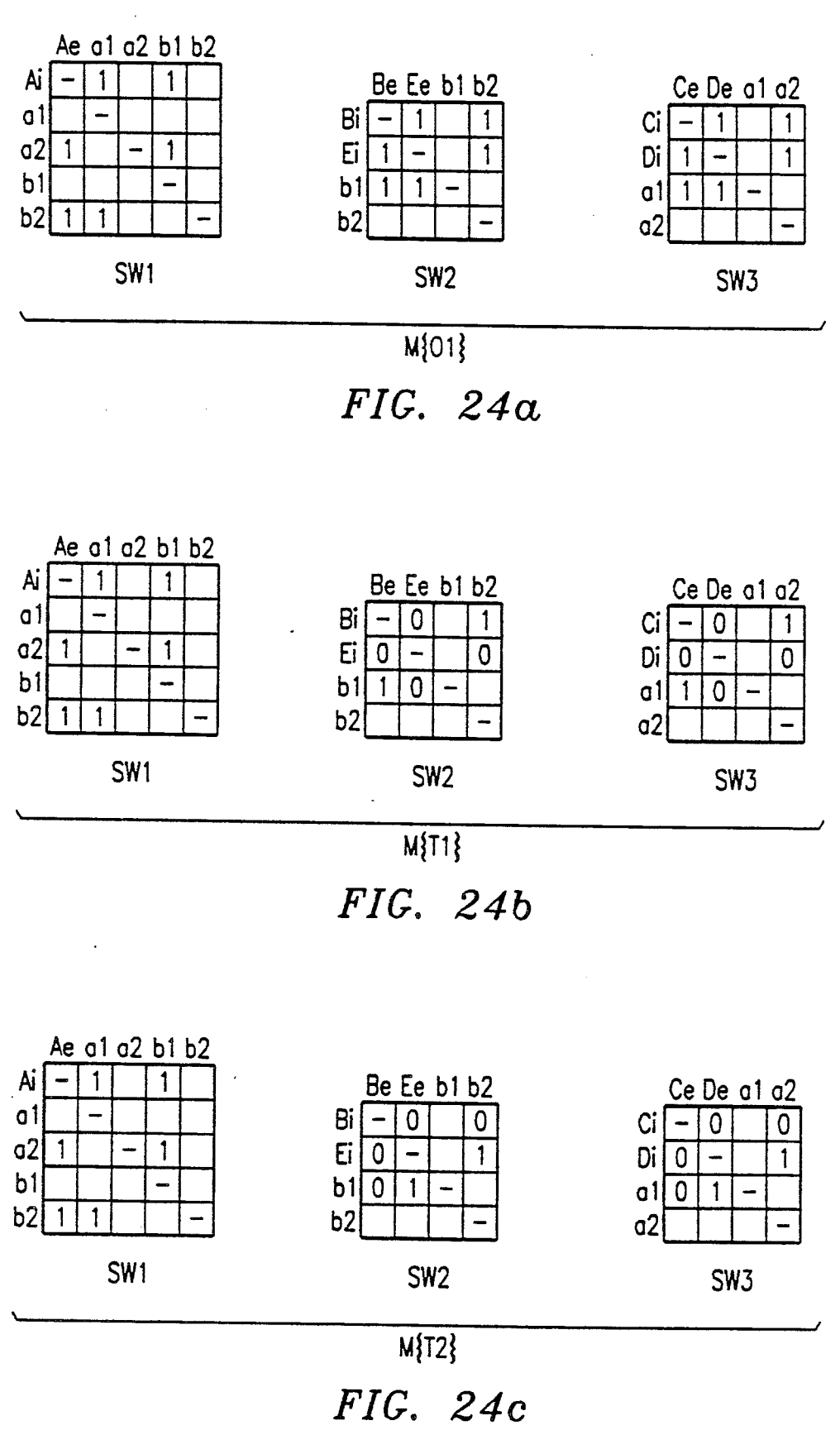
Figures 25A, 25B, 25C:
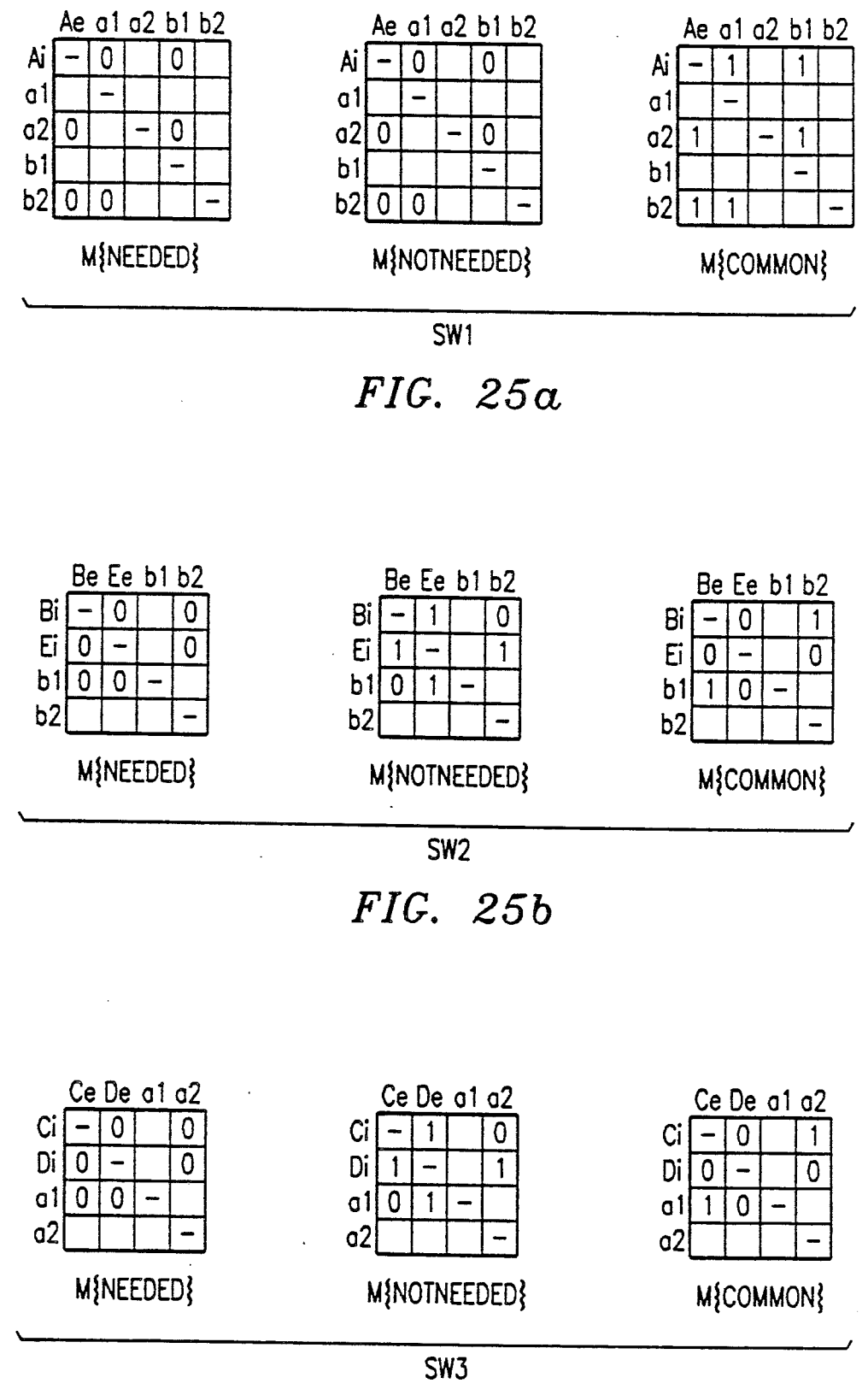

In FIG. 24a–FIG. 24c, a distributed representation is shown of the connections for one original connection, M{O1}, and two target connections, M{T1} and M{T2}. Each matrix is given for each switch in the respective connections. The solution to the distributed case is identical to the centralized case with the exception that individual connections are now used instead of an entire network. Thus, for each switch the matrix subsets described earlier are obtained, M{needed}, M{notneeded}, and M{common}. These are shown in FIG. 25a–FIG. 25c for each switch. With each of these matrices, the micro-operations needed per switch are obtained to transform the original connection, M{O1}, into one of the target connections (M{T1}). Four paths must be deleted from both switches 2 and 3; no paths are added to complete the target connection T1. The entire connection T2 is added to complete the split operation.

It is to be understood that the above-described embodiments are merely illustrative of the principles of the invention and that many variations may be devised by those skilled in the art without departing from the spirit and scope of the invention. It is therefore intended that such variations be included within the scope of the claims.

We claim:

1. A method comprising
   establishing an original connection among an original plurality of user stations through a communication network,
   storing information defining said original connection through said network,
   determining a target connection among a target plurality of user stations through said network, where the union of said original and target pluralities of user stations includes at least two user stations not included in the intersection of said original and target pluralities of user stations, and where said intersection includes at least one user station,
   storing information defining said target connection through said network, based on said stored information defining said original and target connections, determining a set of operations on said network to transform said original connection into said target connection, and effecting said set of operations on said network.

2. A method in accordance with claim 1 wherein said network comprises a plurality of switches, said establishing an original connection comprises establishing paths through an original subset of said switches, said storing information defining said original connection comprises storing information defining said paths through said original subset of said switches, said determining a target connection comprises determining paths through a target subset of said switches, said storing information defining said target connection comprises storing information defining said paths through said target subset of said switches, and said determining a set of operations comprises determining any paths to be deleted from said original subset of said switches and any paths to be added to said target subset of said switches to transform said original connection into said target connection such that no path is both deleted from and added to any switch.

3. A method in accordance with claim 2 wherein said stored information defining said paths through said original subset of said switches comprises individual, intra-switch path information stored by each of said original subset of said switches and said stored information defining said paths through said target subset of said switches comprises individual, intra-switch path information stored by each of said target subset of said switches.

4. A method in accordance with claim 2 wherein each of said plurality of switches stores routing information for routing connections to destination user stations, and wherein said determining paths through said target subset of said switches comprises each of said target subset of said switches determining intra-switch paths based on its stored routing information and said target plurality of user stations.

5. A method in accordance with claim 4 wherein said determining any paths to be added to said target subset of said switches comprises each of said target subset of said switches ascertaining ones of its determined intra-switch paths for said target connection that must be added to transform said original connection into said target connection.

6. A method in accordance with claim 1 wherein said target plurality of user stations includes at least two user stations that are not included in said original plurality of user stations.

7. A method in accordance with claim 1 wherein said original plurality of user stations includes at least two user stations that are not included in said target plurality of user stations.

8. A method in accordance with claim 1 wherein said target plurality of user stations includes at least one user station that is not included in said original plurality of user stations, and said original plurality of user stations includes at least one user station that is not included in said target plurality of user stations.

9. A method in accordance with claim 1 wherein said determining a target connection is performed in response to a request to merge a plurality of connections including said original connection, and said target plurality of user stations comprises a union of the user stations of said plurality of connections.

10. A method in accordance with claim 9 further comprising deleting from said network ones of said plurality of connections other than said original connection.

11. A method in accordance with claim 1 wherein said determining a target connection is performed in response to a request to split said original connection into a plurality of connections including said target connection, and each of said target plurality of user stations is included in said original plurality of user stations.

12. A method in accordance with claim 11 further comprising adding to said network ones of said plurality of connections other than said target connection.

13. A method in accordance with claim 1 wherein said determining a target connection is performed in response to a request to transform a plurality of connections including said original connection into a plurality of connections including said target connection.

14. A method in accordance with claim 1 wherein said network comprises a plurality of switches, and said determining a target connection is performed collectively by ones of said switches using parallel processing.

15. A method in accordance with claim 1 wherein said network comprises a plurality of switches, and said determining a set of operations is performed collectively by ones of said switches using parallel processing.

16. A method in accordance with claim 1 wherein said network comprises a plurality of switches, wherein a connection through said network is described by a matrix having an existing intra-switch path represented as a logic one and a possible intra-switch path represented as a logic zero, and wherein said determining a set of operations comprises obtaining a first matrix having elements each being a logic one only if the corresponding element of a matrix for said original connection is a logic zero and the corresponding element of a matrix for said target connection is a logic one, obtaining a second matrix having elements each being a logic one only if the corresponding element of said original connection matrix is a logic one and the corresponding element of said target connection matrix is a logic zero, and determining said set of operations comprising addition of an intra-switch path for each logic one of said first matrix and deletion of an intra-switch path for each logic one of said second matrix.

17. A method in accordance with claim 1 wherein said network comprises a plurality of switches, wherein a connection through said network is described by a plurality of matrices each corresponding to one of said switches and having an existing intra-switch path represented as a logic one and a possible intra-switch path represented as a logic zero, and wherein said determining a set of operations comprises obtaining a first plurality of matrices having elements each being a logic one only if the corresponding element of a matrix for said original connection is a logic zero and the corresponding element of a matrix for said target connection is a logic one, obtaining a second plurality of matrices having elements each being a logic one only if the corresponding element of a matrix for said original connection is a logic one and the corresponding element of a matrix for said target connection is a logic zero, and determining said set of operations comprising addition of an intra-switch path for each logic one of said first plurality of matrices and deletion of an intra-switch path for each logic one of said second plurality of matrices.

18. A method in accordance with claim 1 wherein said network comprises a multicast packet switching network comprising a plurality of packet switches interconnected by a plurality of inter-switch links, where each connection through said network comprises a subset of said plurality of packet switches and a subset of said plurality of inter-switch links, and each of said plurality of inter-switch links uses at most one logical channel number for each connection.

19. A method in accordance with claim 18 further comprising retaining logical channel numbers for ones of said plurality of inter-switch links that are common to said original and target connections.

20. A method in accordance with claim 18 wherein said original and target connections are multicast connections.

21. A method comprising establishing an original connection effecting an original connectivity pattern among a plurality of user stations through a communication network, storing information defining said original connection through said network, determining a target connection effecting a target connectivity pattern among said plurality of user stations through said communication network, where said target connectivity pattern differs from said original connectivity pattern, storing information defining said target connection through said network, based on said stored information defining said original and target connections, determining a set of operations on said network to transform said original connection into said target connection, and effecting said set of operations on said network.

22. A method in accordance with claim 21 wherein said original and target connectivity patterns are different ones of a plurality of connection types including point-to-multipoint, point-to-multipoint with upstream capability, and multipoint-to-multipoint.

23. A method in accordance with claim 21 wherein said network comprises a multicast packet switching network comprising a plurality of packet switches interconnected by a plurality of inter-switch links, where each connection through said network comprises a subset of said plurality of packet switches and a subset of said plurality of inter-switch links, and each of said plurality of inter-switch links uses at most one logical channel number for each connection.

24. A method comprising storing information defining an original connection among an original plurality of user stations through a communication network, determining a target connection among a target plurality of user stations through said network, where the union of said original and target pluralities of user stations includes at least two user stations not included in the intersection of said original and target pluralities of user stations, and where said intersection includes at least one user station, storing information defining said target connection through said network, and based on said stored information defining said original and target connections, determining a set of operations on said network to transform said original connection into said target connection.

25. A method in accordance with claim 24 wherein said network comprises a multicast packet switching network comprising a plurality of packet switches interconnected by a plurality of inter-switch links, where each connection through said network comprises a subset of said plurality of packet switches and a subset of said plurality of inter-switch links, and each of said plurality of inter-switch links uses at most one logical channel number for each connection.

* * * * *